United States Patent [19]

Katircioglu et al.

[11] Patent Number: 4,932,028

[45] Date of Patent: Jun. 5, 1990

[54] ERROR LOG SYSTEM FOR SELF-TESTING IN VERY LARGE SCALE INTEGRATED CIRCUIT (VLSI) UNITS

[75] Inventors: Haluk Katircioglu, Irvine; John A. De Beule, Rancho Santa Margarita; Debaditya Mukherjee, El Toro; Gary C. Whitlock, Mission Viejo, all of Calif.

[73] Assignee: Unisys Corporation, Blue Bell, Pa.

[21] Appl. No.: 209,664

[22] Filed: Jun. 21, 1988

[51] Int. Cl.[5] .............................................. G06F 11/00

[52] U.S. Cl. ................................... 371/16.5; 371/29.1

[58] Field of Search ..................... 371/5, 3, 15, 16, 19, 371/21, 9, 1, 15.1, 21.1, 9.1, 16.5, 29.1; 364/200, 900

[56] References Cited

U.S. PATENT DOCUMENTS

| | | | |
|---|---|---|---|
| 4,205,301 | 5/1980 | Hisazawa | 371/3 |
| 4,209,846 | 6/1980 | Seppa | 371/5 |
| 4,339,657 | 7/1982 | Larson | 371/5 |
| 4,635,214 | 1/1987 | Kasai | 371/5 |
| 4,726,024 | 2/1988 | Guziak | 371/16 |
| 4,755,997 | 7/1988 | Takahashi | 371/5 |
| 4,821,269 | 4/1989 | Jackson | 371/16 |
| 4,829,520 | 5/1989 | Toth | 371/16 |

*Primary Examiner*—Michael R. Fleming
*Attorney, Agent, or Firm*—Alfred W. Kozak; Nathan Cass; Robert S. Bramson

[57] ABSTRACT

A VSLI chip is implemented with registers which log permanent and intermittent errors occurring within the chip as sensed by concurrent error detection circuitry (CED). If a fatal error is detected (one which would destroy the reliability of chip operations), then the chip is immobilized into a hold mode (freeze). Interrupts are signalled to a cooperating maintenance controller which can pass the error information to an external computer for display and for locating a faulty area.

26 Claims, 16 Drawing Sheets

← (SEE FIG. 7)

| TEST MODE B | T1 (214) | T0 (215) | TC (211) | SHIFT B (208) | HOLD B (212) | SYHB (213) | C1 (231) | C0 (232) | TE (233) | FUNCTION |
|---|---|---|---|---|---|---|---|---|---|---|
| 0 | 0 | 0 | 0 | 1 | 0 | X | 1 | 0 | 0 | LOOP. WALKING PATTERN GEN. |
| 0 | 0 | 0 | 1 | 1 | 0 | X | 0 | 0 | 0 | HOLD DUE TO TC=1 |
| 0 | 0 | 1 | 0 | 1 | 0 | X | 1 | 0 | 0 | RANDOM PATTERN GEN. |
| 0 | 0 | 1 | 0 | 1 | 0 | X | 0 | 0 | 0 | HOLD DUE TO TC=1 |
| 0 | 1 | 0 | 0 | 1 | 0 | X | 0 | 0 | 1 | SIGNATURE COLLECTION. T1 IS INPUT. |
| 0 | 1 | 0 | 1 | 1 | 0 | X | 0 | 0 | 0 | HOLD DUE TO TC=1 |
| 0 | 1 | 1 | 0 | 1 | 0 | X | 0 | 0 | 0 | HOLD DUE TO T1,T0 |
| 0 | 1 | 1 | 1 | 1 | 0 | X | 0 | 0 | 0 | HOLD |
| 1 | X | X | X | 0 | 0 | X | 1 | 0 | 0 | SHIFT |
| 1 | X | X | X | 1 | 0 | X | 0 | 0 | 0 | HOLD DUE TO HOLD B |
| 1 | X | X | X | 1 | 1 | 0 | 0 | 0 | 0 | HOLD DUE TO SYHB. NORMAL MODE. |
| 1 | X | X | X | 1 | 1 | 1 | 1 | 1 | 0 | LOAD. NORMAL MODE |

154
CHIP LOGIC
159
167
D(0-15)
SDI
SYNB
HOLDB
MFSR X
SDO
CHIP SDO
Q(0-15)
CS
160
CHIP LOGIC
155
156
60f
FATAL ERR BAR TO MC
CHIP LOGIC
ERR SDI
D(0-15)
SDI
SYNB
HOLDB
MASK
REG. 2
SDO
Q(0-15)
16 BITS
171
(0-15)
SDI
SYNB
HOLDB
ADDITIONAL
INFO REG.
SDO
Q(0-15)
16 BITS
172
NOT
CONNECTED
ERROR BAR TO MC
83
ES

CED LOGIC 2
153
GCED 1
CED(0-15)
GCED
GCED 2
51
SHADOW REG. Q(0-15)
SHADOW ENBLE
LOAD LOGIC 2
ERROR REG. D(0-15)
SHADOW D(0-15)
176
83
BAR ERROR
FATAL ERRS
178
175
165
D(0-15)
SDI
SYNB
HOLDB
SHADOW REG. 2
SDO
MFSRm
Q(0-15)
164
16 BITS
CONTROL & FATAL ERROR LOGIC
SDI
HOLD ERR BAR
HOLD BAR
SDO
MFSRn
CLEAR LOAD SHADOW REG.
81
D(0-15)
SDI
SYNB
HOLDB
ERROR REG. 2
SDO
Q(0-15)
169
16 BITS
D(0-15)
SDI
SYNB
HOLDB
MASK REG. 1
SDO
Q(0-15)
170
16 BITS
7
16 BITS
ERROR BAR
83

ERROR LOG SYSTEM FOR SELF-TESTING IN VERY LARGE SCALE INTEGRATED CIRCUIT (VLSI) UNITS

FIELD OF THE INVENTION

This disclosure relates to the field of large scale integrated circuit chips which do self-testing and error reporting. Also, this disclosure relates to the implementation of digital circuits placed in large scale integrated chips.

BACKGROUND OF THE INVENTION

In recent years it has been seen that the complexity and density of very large scale integrated circuit designs has increased manyfold. As a result of this, it has become increasingly important to establish the reliability of this type circuitry.

Many of the present day large scale integrated circuit desings have been implemented with error detection circuits, such as parity generation and parity checking circuits. Such types of circuits are often designated as CED (concurrent error detection) circuits. Many of the systems in the prior art do detect errors by the use of conventional error-checking circuits and then will often inform a maintenance processor of the error. To a great extent, however, the error-related information obtained is very limited and sufficient information cannot be obtained unless the entire scan path is analyzed.

The system presented here is applicable to VLSI designs where a scan path is utilized. In a chip, flip-flops are connected to each other to form one or more long shift registers. Those long shift registers are also designated as a shift chain, snake or scan path.

The purpose of implementing snakes in a VLSI design is to minimize the maintenance controller interface signals. All the data, for example, chip initialization data, are shifted (written) into the snakes through an SDI, serial data input, or shifted out (read from) the snakes through an SDO, serial data output, in serial form.

The objective of the present system is to sample the outputs of the concurrent error detection (CED) circuits and to collect sufficient error information for a maintenance controller to analyze the error data under normal operating conditions and not merely under specialized error checking conditions.

Thus, it is an objective of this system to provide circuits in a VLSI device together with an error log and analysis mechanism which can operate without disrupting the normal operation of the system for one set of faults, and further to generate a signal to freeze the VLSI circuit for another type of faults, in order to prevent erroneous data from being propagated into other modules.

Additionally, the system of this disclosure operates to provide circuitry that will provide exhaustive self-test of the concurrent error detection (CED) circuits and to provide a structured and expandable error logging and reporting circuit system for the large scale integrated chip.

SUMMARY OF THE INVENTION

The system of the present disclosure involves a circuit implemented in very large scale integrated format for logging and for reporting errors occurring during normal operations.

The circuitry is provided with two register stages. The first register stage is capable of providing detailed error information and reporting it to a maintenance controller through a serial interface.

A second register stage logs the errors occurring only during the transfer of information from the first register stage to the maintenance controller, and the second register stage can accumulate this error information so that no information is lost on accumulated errors at any time.

The system captures both the permanent and the intermittent faults as they are detected by the concurrent error detecting circuits (CED), hence providing the maintenance controller with a mechanism to alert the field engineer or operator of a potential error by means of counting the intermittent errors.

The VLSI implemented circuitry system provides a "hold" signal to freeze the state of the entire circuit in those cases where the error incurred is a "fatal error", thus providing a mechanism for the maintenance controller to take possible recovery action.

Additionally, with the use of a mask register, the VLSI implemented circuitry system may suspend the reporting of selective errors, under the control of the maintenance controller.

Additionally, in the test mode, the circuitry operates to exhaustively test the CED circuits in order to obtain proper error detection coverage.

In the system, the first stage register ($E_s$, FIG. 3) is made up of an error register, a mask register, an additional information register, and a shadow flag flip-flop. The first stage register is called an error snake, $E_s$, FIG. 3. There are no other fields in this snake and it is shiftable without affecting other parts of the chip, even during normal run time.

The second stage register is called the shadow register, and is part of a chip snake $C_s$, FIG. 3. The chip snake is the shift register formed by all the flip-flops that perform the specified functions of the chip. There may be more than one chip snake in a chip, but one chip snake is assumed here for simplicity.

Every snake has its own serial data input and output.

The purpose of making the error snake shiftable when the chip is in normal operation mode is that error information may be obtained without disturbing the operation of the chip during run time, for non-fatal errors. If the error is fatal, the entire chip is frozen (hold state).

BRIEF DESCRIPTION OF THE DRAWINGS

FIG. 12(*b*) shows an error load logic symbol representation;

FIG. 13(*b*) shows a control and fatal error logic symbol representation;

FIG. 14(*b*) shows a shadow flag flip-flop symbol representation;

DESCRIPTION OF PREFERRED EMBODIMENT

Figure 1:
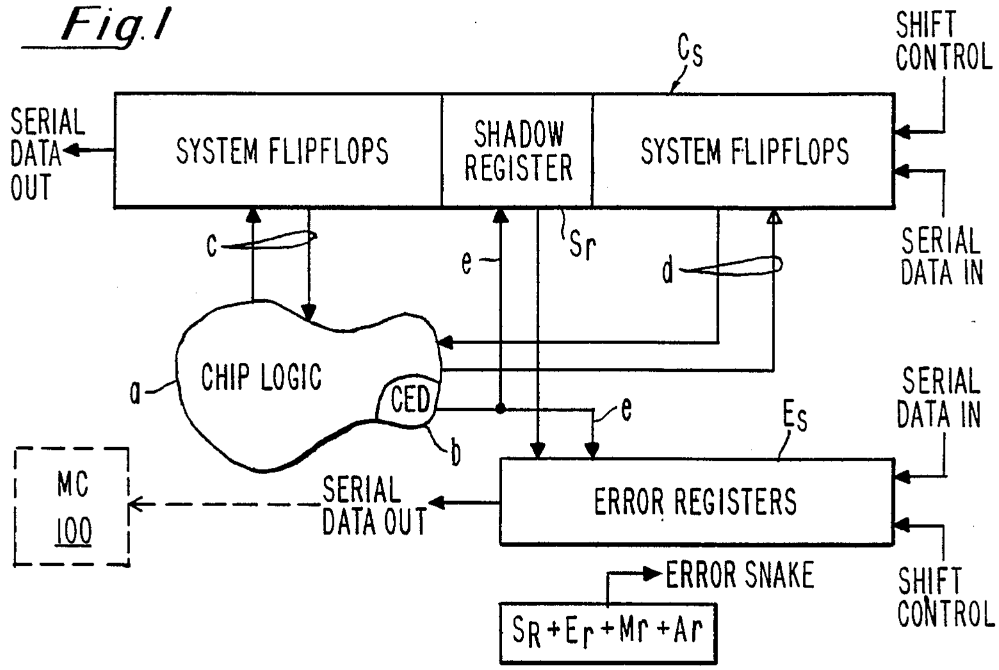
FIG. 1 is a block diagram of the chip snake and error snake in a VLSI chip.

FIG. 1 shows a generalized diagram of a VLSI chip that has snake implementation to provide controllability and observability to its states.

All the flip-flops in the chip may be connected as a shift register that is called a snake. A maintenance controller can access this snake using serial data input and output pins, thus minimizing maintenance interface requirements. This snake is called the chip snake, $C_s$.

The designation "a (chip logic)" indicates the combinatorial circuits that a system may have. System flip-flops in the chip snake, $C_s$, generate signals to the combinatorial circuit "a", and/or may capture the outputs of the combinatorial circuit "a" as shown by lines c and d.

If CED (concurrent error detection circuits b) have been implemented in the design, registers are required which may be formed as a snake to capture the error signals "e". This snake is called the error snake, $E_s$. When an error is captured, a maintenance controller (100, FIG. 2) accesses the error snake to get information on the error.

Figure 3:
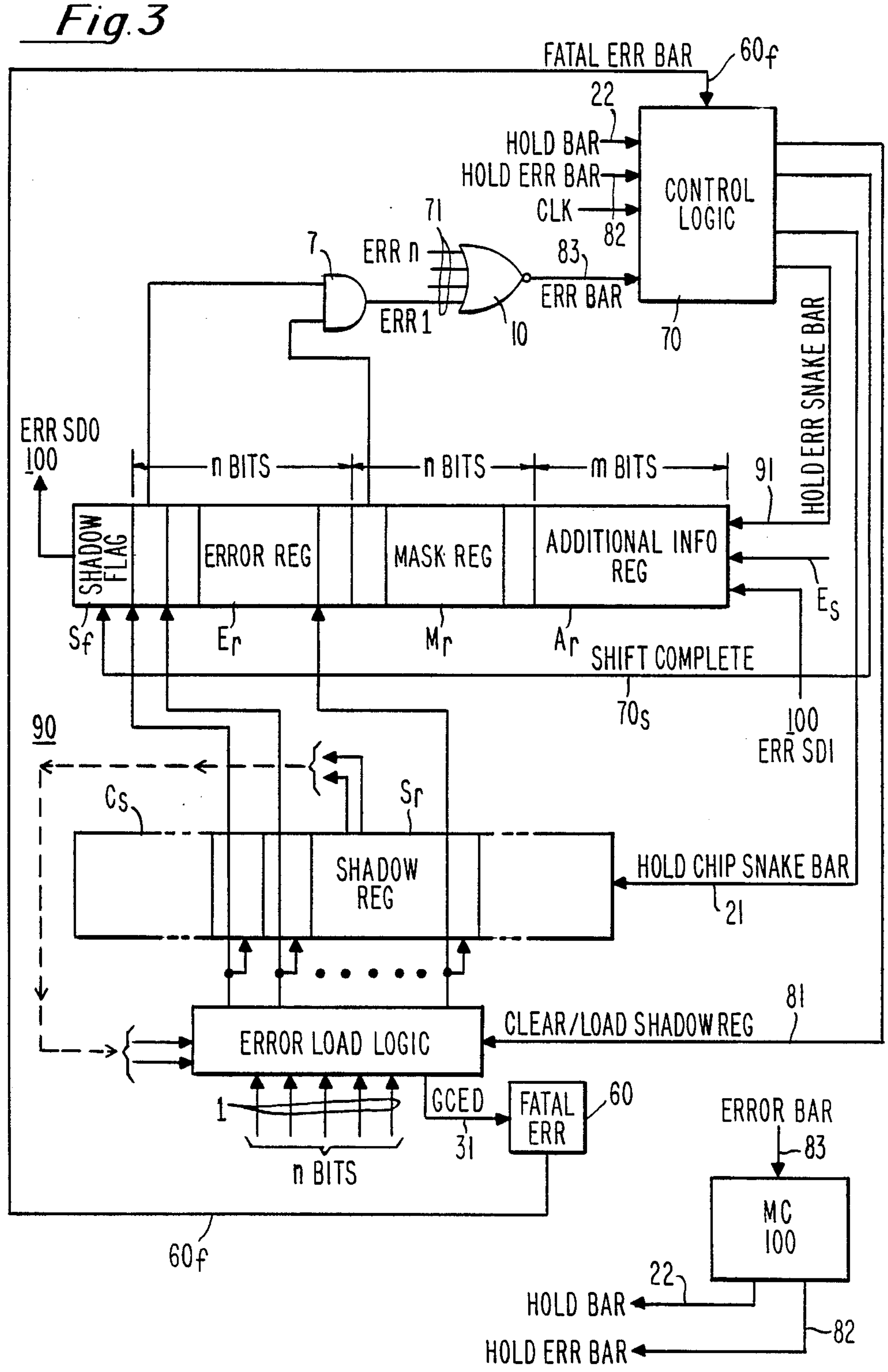
FIG. 3 is a block diagram of the error log system.

A shadow register $S_r$, FIG. 3 is required to capture the error signals e when the error snake is being accessed by the maintenance controller. The shadow register $S_r$, FIG. 3, resides in the chip snake $C_s$, and it transfers its information to the error snake, $E_s$, when the maintenance controller's access to the error snake is complete.

Figure 2:
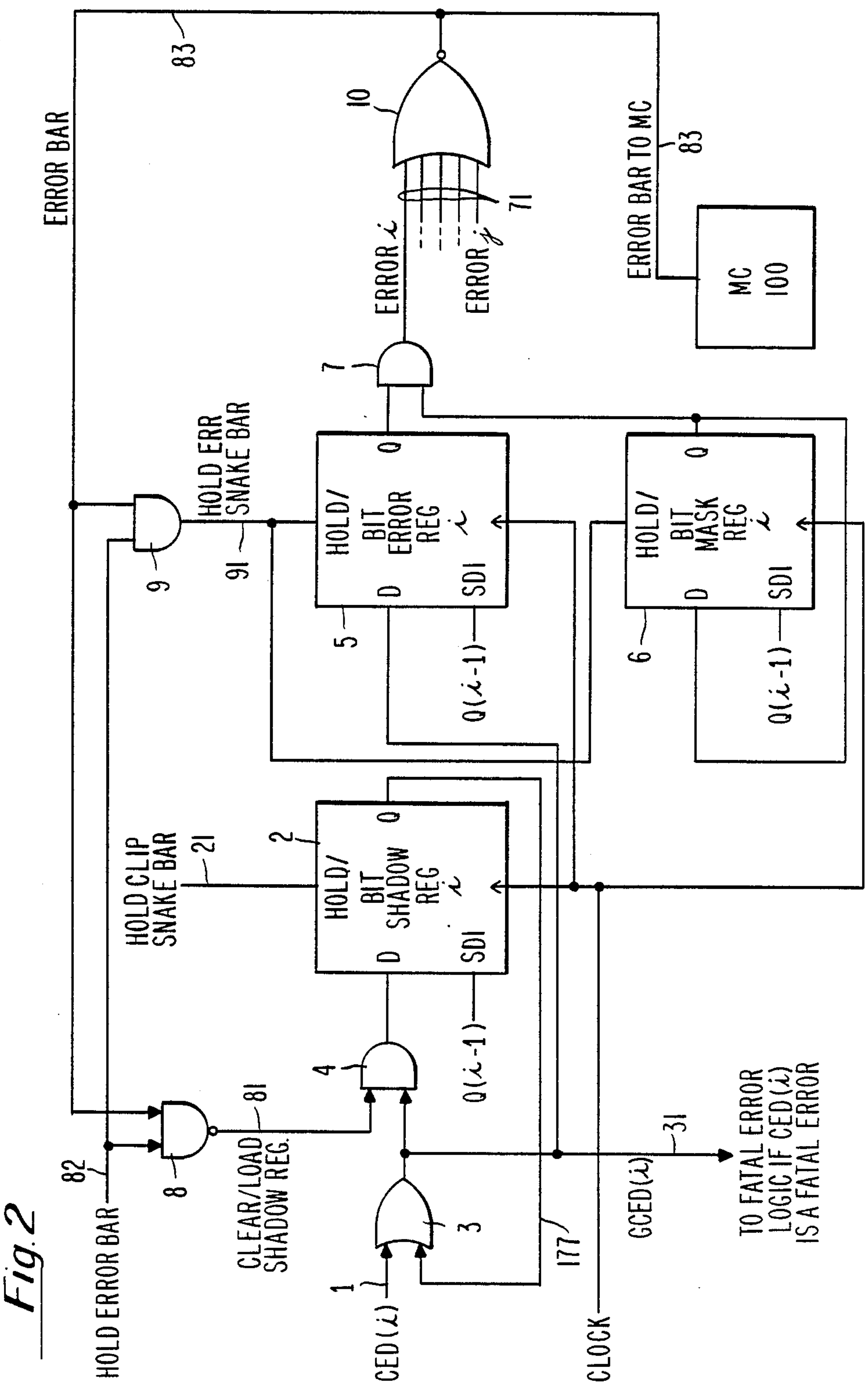
FIG. 2 shows a block diagram illustrating one bit of the error log system.

With reference to FIG. 2, there is seen a "bit slice" of the error log register, 90 of FIG. 3. In FIG. 2 it is indicated how one bit of the CED (concurrent error detection) information is handled. The concurrent error detection signal 1 is designated as CED(i). It is ORed with the output of one bit of the shadow register 2, thus accumulating the errors involved.

An OR gate 3 receives the concurrent error detection signal CED(i) and also the Q signal from the shadow register 2. The output of the OR gate 3 is ANDed by means of AND gate 4 with the "NAND" 8 of the "HOLD-ERROR-BAR" and the ERROR-BAR.

The HOLD-ERROR-BAR signal (FIG. 2) is designated as 82 while the ERROR-BAR signal is designated as 83.

Thus the signal 1 of the CED(i) will be loaded into the shadow register 2 (one bit) only if the HOLD-ERROR-BAR 82 and/or the ERROR-BAR 83 are in the condition of low (active).

In FIG. 2, the error register 5 is a flip-flop which is a part of the error register $E_r$ (FIG. 3) while the mask register 6 is a flip-flop which is part of the mask register $M_r$ shown in FIG. 3.

Thus, while FIG. 2 indicates the circuitry for one bit of information, the circuitry of FIG. 3 indicates the circuitry for "n" bits of information. In FIG. 2, the mark "i" indicates one bit while "(i−1)" indicates a shift of the one bit.

There is a one-to-one correspondence between one mask bit and one error register bit.

The Q output of error register 5 is ANDed with the AND gate 7 which also receives the Q output of mask register 6.

The single mask bit in mask register 6 is set to "1" if it is not desired to mask the signal 1, CED(i). Thus the output of the AND gate 7 will be the same as that of the error register flip-flop 5.

The outputs of the AND gate 7 and other AND gates at the outputs of other bits of the error register $E_r$ and the mask register 6 form the ERROR signals 71, (i . . . j) FIGS. 2 and 3. The NOR gate 10 (FIGS. 2 and 3) receives all the ERROR signals and generates ERROR-BAR signal 83 which causes, when active, a hold on the error snake $E_s$ of FIG. 1, and enables the shadow register 2 through gates 8 and 4 (FIG. 2) to load subsequent ERROR signals, if any.

In the normal or "no error" condition, the input to the bit "i" of the shadow register 2 is always "0", where HOLD-ERROR-BAR is equal to "1 " and the ERROR-BAR is equal to "1". These are the signal lines 82 and line 83, FIGS. 2, 3.

If an error occurs where CED(i) is equal to "1", then the output Q of bit error register 5 goes high and the ERROR-BAR signal 83 goes low if the error is not masked. The signal 83 holds the error-register-bit and at the same time enables the shadow-register-bit of register 2 so that the subsequent errors on CED(i) can be loaded into the flip-flop of the shadow register 2 of FIG. 2.

The ERROR-BAR 83 signal also goes to the maintenance controller (MC) 100 and warns the MC of the error condition.

The bit (FIG. 2) error register 5 and the bit (FIG. 2) in mask register 6 are in the same shift chain called the "error snake", $E_s$ of FIG. 1.

The shadow register 2 is connected to another shift chain called the "chip snake", $C_s$ of FIG. 1.

The shift chain that contains the error register 5 and the mask register 6 may be shifted when the signal 82 (HOLD-ERROR-BAR) is active and thus equal to "0 ".

The shift chain that the shadow register 2 is part of, may be shifted when the signal 21 (HOLD-CHIP-SNAKE-BAR) is active and thus equal to "0".

As long as the error snake $E_s$ is in the "hold mode", then the errors are accumulated in the shadow register 2.

The output of the OR gate 3 (FIG. 2) becomes the signal GCED(i) 31 (FIGS. 2, 3) if the error signal 1 or CED(i) is fatal.

In FIG. 3 there is seen a higher level schematic drawing of the error snake, $E_s$, implementation of an "n" bit error snake. In this case the error snake is any multiple of 16 because the error snake has been implemented using a multiple function shift register (MSFR) which is 16 bits wide.

The error snake circuitry is basically composed of elements $S_r$, $S_f$, $E_r$, $M_r$, and $A_r$, as indicated in FIG. 3.

An MSFR is basically a BILBO or built-in logic block observer which has the functions of—Hold, Load, Shift, Pattern Generation, and Signature Collection.

In the chip testing function, the MSFR can generate patterns or collect signatures to test a combinatorial network.

The error log circuitry 90 of FIG. 3 contains two shift chains. One is called the "error snake" ($E_s$) and the other is called the "shadow register" ($S_r$) of FIG. 3 which is part of another chain called the "chip snake" ($C_s$). In the simplest case, all functional flip-flops on the chip are part of the chip snake ($C_s$).

In FIG. 3, the shadow flag flip-flop ($S_f$) is used to tell whether the information contained in the error register ($E_r$) has been loaded from the shadow register ($S_r$) or not.

If the shadow flag flip-flop ($S_f$) of FIG. 3 is set, it implies that the contents of the error register ($E_r$) have been loaded from the shadow register ($S_r$) and that more than one error may have been logged.

These errors are logged during the previous hold of the error snake. The "SHIFT-COMPLETE" signal (70$_s$ of FIG. 3) generates a pulse from control logic 70 at the end of the shift operation of the error snake when the HOLD-ERROR-BAR signal 82 is deactivated. This deactivating pulse is called the SHIFT-COMPLETE signal (70$_s$).

If the shadow register ($S_r$) has logged errors, then the shadow flag flip-flop register ($S_f$) is set to "1" and is held as such.

Figure 4:
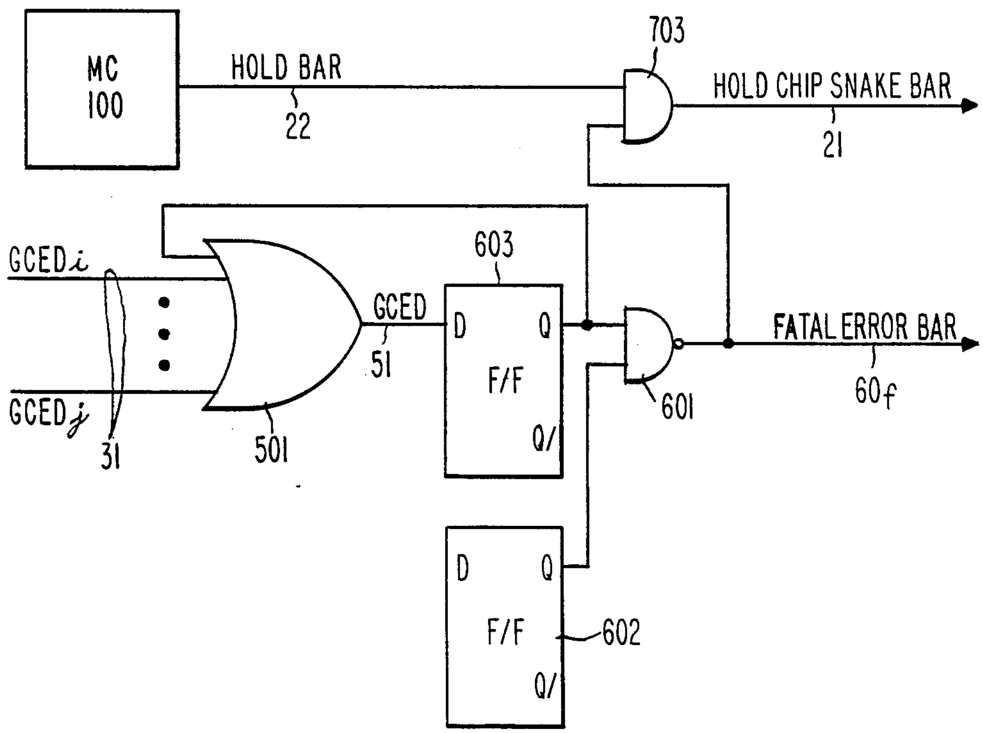
FIG. 4 is a diagram of the control and fatal error logic circuit.

In FIG. 3, the logic circuit 50 is the error load logic circuitry which is equivalent to OR gate 3 plus an AND gate 4 of FIG. 2 and the OR gate 501 of FIG. 4. The "n" bit circuitry for the load logic 50 is the logic for the shadow register ($S_r$) of FIG. 3 and is controlled by the CLEAR/LOAD signal 81 from the control logic 70.

The control logic 70 is made up of the NAND gate 8 plus the AND gate 9 of FIG. 2 in addition to the gate 703 of FIG. 4.

As long as there are no errors logged in the error register ($E_r$), the load logic 50 is disabled. As soon as an error does occur, the error snake is held and the load logic 50 is enabled, so that subsequent errors are then logged in the shadow register ($S_r$).

The GCED 31 signal is the input to the fatal error circuit 60 in FIG. 3, which is made up of the NAND gate 601 and the flip-flops 602 and 603 of FIG. 4.

Referring to FIG. 4, there is seen a diagram of the control and fatal error logic 60, also seen in block 60 of FIG. 3.

In FIG. 3 there was shown the block designated as the fatal error logic error 60. When this block is shown in more detail it will be seen to be composed of those items in FIG. 4 which are designated as flip-flop latch 603, mask fatal error flip-flop 602, and NAND gate 601.

Referring back to FIG. 2, it was seen that the signal line 31 represented the GCED(i) signals which are considered fatal to the operation of the chip. In FIG. 4, the i . . . j signals 31 (FATAL ERROR signals only) are placed through an ORing function of gate 501 and registered in a flip-flop 603 and thence gate 601 to generate the FATAL-ERROR-BAR signal 60$_f$.

For circuit debugging purposes, the signal 60$_f$ may be masked on gate 601 by the flip-flop 602.

In case of a "fatal error", the chip operation must be stopped in order not to propagate the error to other modules around the chip. Thus the FATAL-ERROR-BAR signal (60$_f$) and the HOLD-BAR signal 22 (from the maintenance controller) are ANDed by the AND gate 703 (FIG. 4) to generate the signal 21 which is the HOLD-CHIP-SNAKE-BAR signal that "freezes" the chip snake.

The chip operation may be frozen by the HOLD BAR signal 22 (FIG. 3) from the maintenance controller 100 or else by the FATAL-ERROR-BAR signal 60$_f$, when there is a fatal error.

The AND gate 703 (FIG. 4) is located in the control logic 70 of FIG. 3. The fatal-error flip-flop 603 and the mask fatal-error flip-flop 602 are in the chip snake shown as $C_s$ of FIG. 3.

Before the exact implementation is delineated, basic components used in the system will be described.

Figure 5:
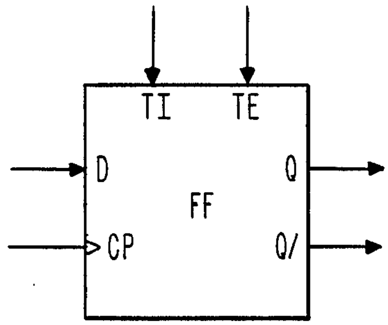
FIG. 5 is an illustration of the D-type flip-flop used in this system.

FIG. 5 shows the symbol for a D-type flip-flop that has been used in the design, where CP=clock input
D=data input when TE=0
TI=data input when TE=1
TE=selects between D and TI
Q=true output
Q/=false output As was discussed earlier, MSFRs have been used as registers in this system. An MFSR stands for "multiple function shift register" which is basically a linear function shift register (LSFR) described by the polynomial:

$$P(x)=1+x^4+x^7+x^9x^{16}$$

A 16-bit MSFR has been built using 18 flip-flops of the type described in FIG. 5.

The MFSR designed for this system provides the following functions:

(i) Load function: The MFSR functions as a parallel load register. All flip-flops are loaded at the same time. Load function is the normal operation mode.

(ii) Hold function: Present state of the MFSR is frozen if a hold function is being performed. No new data is loaded. An MFSR may be held in both normal operation and maintenance mode.

(iii) Shift function: Eighteen flip-flops form a shift register (snake). State of a flip-flop is shifted to the next flip-flop stage. Shift function is performed in maintenance mode.

(iv) Pattern Generation: An MFSR is used as a pattern generator if its outputs are feeding the inputs of a combinatorial circuit. An MFSR can generate looping (walking) patterns or random patterns (all 16-bit possible combinations except zero). Pattern generation is a maintenance mode function.

(v) Signature Collection: An MFSR can collect signatures if its inputs are being fed by the outputs of a combinatorial circuit. At each clock, the present state of the MFSR is exclusively ORed with the present outputs of the combinatorial circuit and shifted. The compressed data resulting in the MFSR after a specified number of clocks is the signature. Signature collection is a maintenance mode function.

Figure 6:
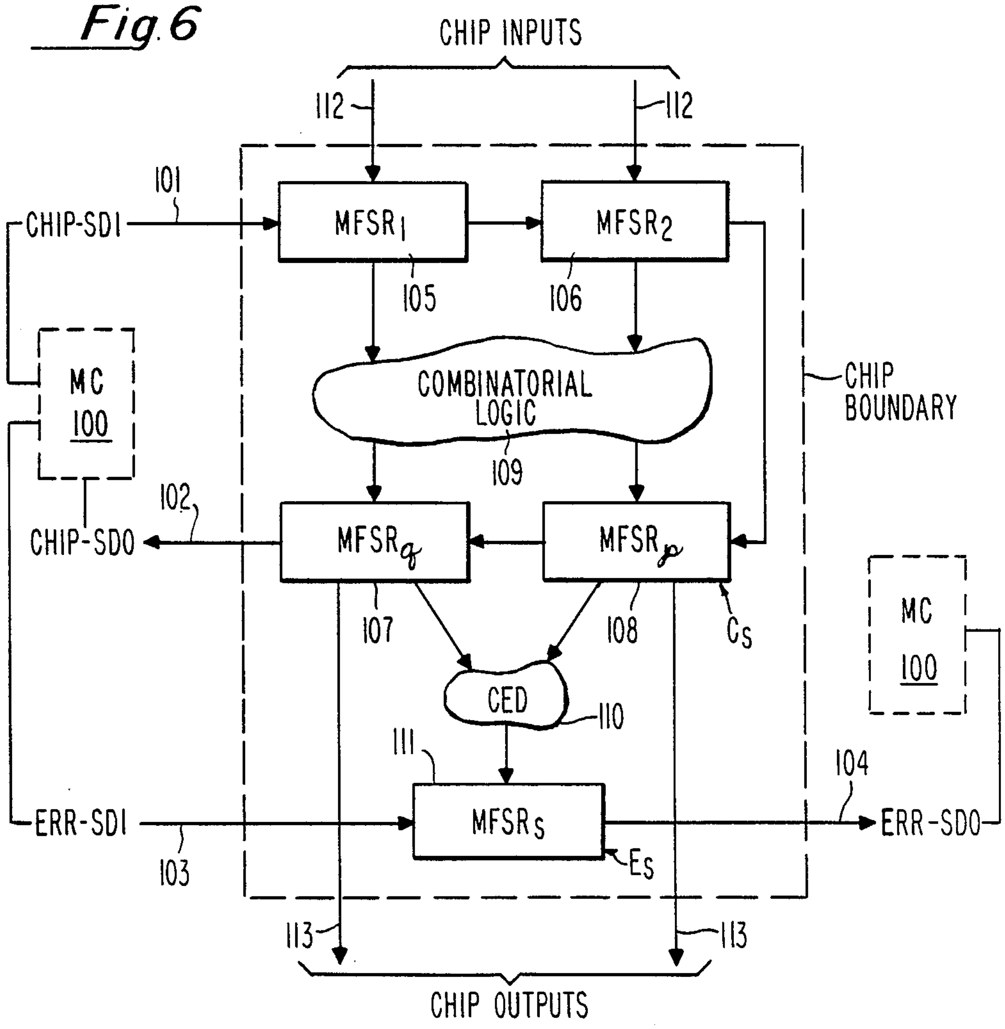
FIG. 6 illustrates a chip implemented with multiple function shift registers (MFSRs)

Referring to FIG. 6, to elaborate on the use of MFSRs in a chip for normal functions as well as self-testing, there is seen a chip in which MFSRs are utilized as registers. All MFSRs are connected to each other to form a chip snake ($C_s$) and an error snake ($E_s$).

For normal operation, the chip is initialized using the serial path (with CHIP-SDI 101 and CHIP-SDO 102; ERR-SDI 103 and ERR-SDO 104) by the maintenance controller, 100. Then, the chip is returned to normal mode. In normal mode, $MFSR_1$ (105) and $MFSR_2$ (106) may capture the inputs 112 from other chips; and process those signals through the combinatorial circuit 109 and register the result in $MFSR_q$ (107) and $MFSR_p$ (108). The results may be sent out of the chip through the chip outputs 113.

Concurrent error detection (CED) circuits 110 (FIG. 6) are utilized to detect run time errors. If any error occurs, it is captured by the error snake ($E_s$). Then, the maintenance controller may shift out the error snake to determine the error and analyze the error that occurred.

If the chip is to be tested with a scheme that is called BIST, built-in self test, the maintenance controller initializes the chip, such that $MFSR_1$ (105) and $MFSR_2$ (106) will generate patterns; and $MFSR_q$ (107) and $MFSR_p$ (108) will collect signatures to test the combinatorial circuit 109. At the end of the test, the maintenance controller will shift out the chip snake to analyze the signature. The same method is used to test the CED (110) logic by collecting signatures at the error snake ($E_s$).

During testing, at each clock, a new pattern is generated by the pattern generating MFSR and the result is compressed as signature by the signature collecting MFSR. If the test is done on a defective circuit, the signature would be different from the expected signature which was obtained from the good circuit with the same patterns.

Figure 7A:
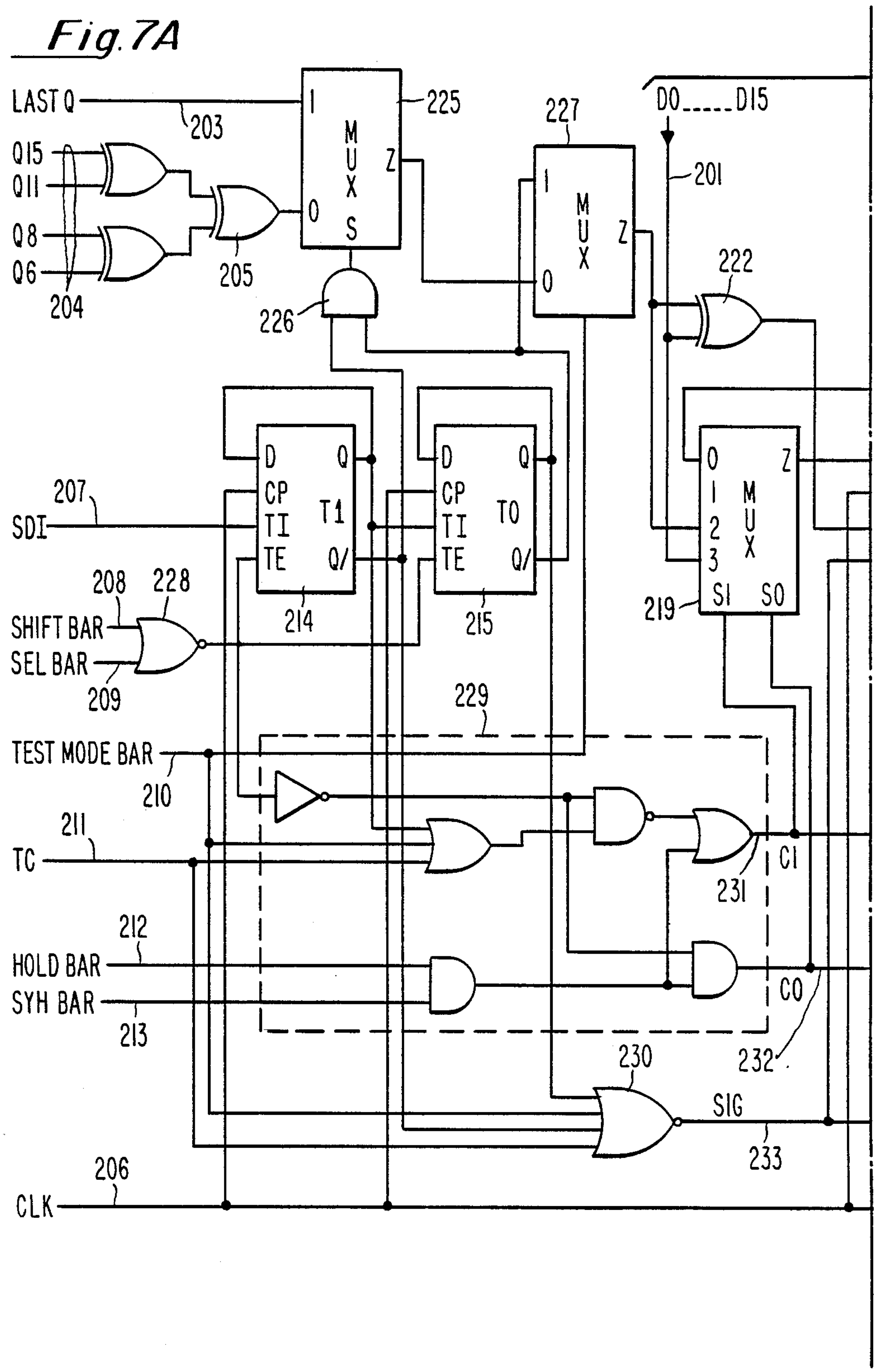
FIGS. 7A and 7B is a diagram of a 16-bit MFSR implementation.
Figures 7, 7A, 7B:
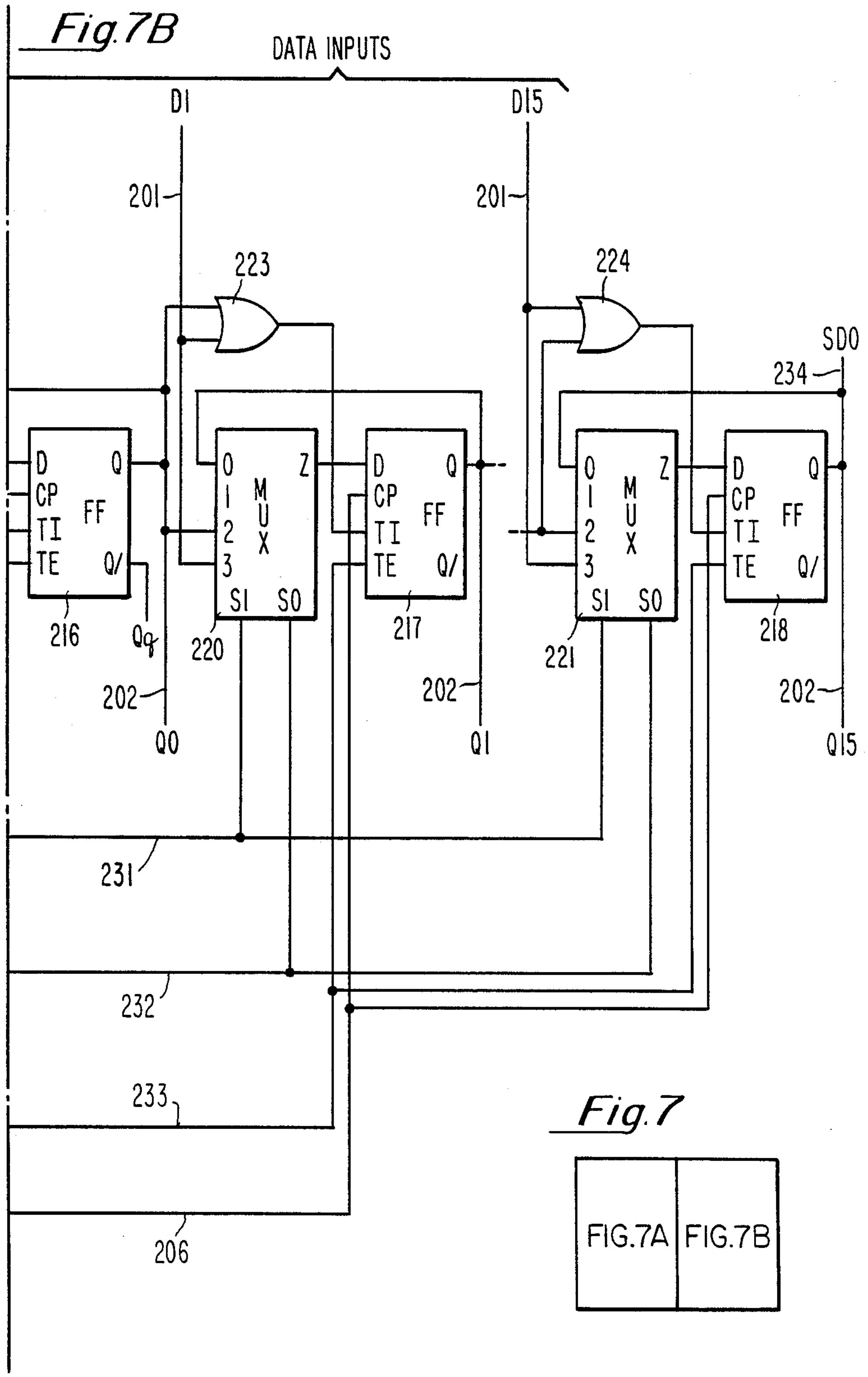

FIG. 7 is the complete schematic for the MFSR used in this system.

The first two flip-flops (T1, T0) as shown by 214 and 215, are the configuration flip-flops. The sixteen flip-flops numbered as 216, 217 and 218 are the ones that are used as a register for normal operation and as a pattern generator or a signature collector in test mode.

Normal mode is when all maintenance control signals are inactive. SYHBAR (213) is the only signal that performs the normal mode operations: load and hold. The logic in the chip that uses the MFSR asserts or denies the SYHBAR 213 signal. With all the maintenance signals being "1" (inactive), SYHBAR propagates through the circuit group shown by 229 and determines the levels of signals (C0, C1) 232 and 231 which select one of four inputs on the fifteen serial multiplexors designated 219, 220—and 221.

If the MFSR is being selected (addressed), SYHBAR will be a "1" and C0, C1=11 and input 3 on the four-input multiplexors will be selected. Therefore, the data inputs (FIG. 7) D0-D15, shown by 201, will be loaded in parallel to the respective flip-flops through their D inputs.

If the MFSR is not being selected, SYHBAR will be a "0" and C0, C1=00 and input 0 on the four-input multiplexor will be selected. Hence, the present state of the register will be reloaded, or in other words, it is frozen.

Maintenance control signals are SDI (207), serial data input; SDO (234), serial data output; SHIFT-BAR (208), shift control signal; SEL-BAR (209), select signal; TESTMODE-BAR (210), test mode signal; TC (211), test count signal; HOLD-BAR (212), hold bar signal.

Except for the TC (211) signal, these signals are all generated by the maintenance controller, and are all active low signals. TC (211) is a signal generated by a counter in the chip and it is an active high signal. This counter is called "test counter" and it times the duration the self test runs. When TC goes active (=1), the test mode ends.

As long as HOLD-BAR 212 is active (=0), the MFSR is in maintenance mode. If HOLD-BAR 212 is the only active signal, then the MFSR is in hold mode.

Hold Mode

HOLD-BAR is "0"; all other maintenance signals are "1". The level on the HOLD-BAR 212 line will propagate through the circuit shown by 229 (FIG. 7A) and the outputs C0, C1=00 and hence the present state of the MFSR will hold. The (T1 and T0) 214 and 215 flip-flops, have been designed such that if there is no shift operation, they always hold.

Shift Mode

HOLD-BAR=0, SHIFT-BAR=0, SEL-BAR=0. The shift operation overrides the hold mode. The output of the NOR gate 228 (FIG. 7A) puts a "1" on the TE inputs of the (T1) 214 and (T0) 215 flip-flops and the TI data inputs will be selected. SDI 207 supplies the input data in serial form, and the shift path that is selected on the MFSR is through the input 1 of multiplexor 227 (FIG. 7A) and input 2 of the four-input multiplexors 219, 220, 221 (FIG. 7B) and through the D inputs and Q outputs of the flip-flops to the SDO 234 serial data output, FIG. 7B.

The reason for keeping HOLD-BAR 212, FIG. 7A, active during a shift operation is that in case the shift cannot be done continuously (may be done eight bits at a time), between shift operations, the data in the snakes must be held.

Pattern Generation

HOLD-BAR=0, TESTMODE-BAR=0. (FIG. 7) Before TESTMODE-BAR 210 is activated, proper data must be set in T1, T0 (214, 215) and fifteen data registers, through a shift operation. The outputs of the T1, T0 flip-flops determine the type of patterns to be generated. The data in the fifteen data flip-flops (216, 217—218) is called the "seed" for the patterns.

When the TESTMODE-BAR 210 (FIG. 7A) is activated, T1, T0 flip-flops continue to hold, and the input 0 of the multiplexor 227 is selected and the shift path on the fifteen four-input multiplexors and fifteen flip-flops is also selected, that is selected in shift-mode as well. If T1, T0=00, then the Last Q (203) determines the serial input to the shift path. If Q15 is connected to the Last Q (203), 16-bit walking (looping) patterns are generated. In cases where MFSRs are concatenated, the Q15 (FIG. 7B) of the last MFSR is connected to the Last Q input of the first MFSR to generate long walking patterns.

If T1, T0=01, then input 0 of the multiplexor 225 is selected. This signal is the output of an EXOR (exclusive OR) function 205 whose inputs are Q6, Q8, Q11, Q15 shown as 204 (FIG. 7A), feedback lines from the respective flip-flops. This way, 16-bit random patterns are generated. These are all 16-bit possible combinations, except all-zeros, generated randomly rather than binary counter fashion.

Pattern generation starts as soon as TESTMODE-BAR 210 (FIG. 7A) is activated and continues until TC 211 goes active (=1) although TESTMODE-BAR is kept active.

Signature Collection

HOLD-BAR=0, TESTMODE-BAR=0. T1, T0=10, a seed in the fifteen flip-flops must be set up through a shift operation.

The inputs 0 on the multiplexors 225 and 227 are selected as for random pattern generation. Since the output of the NOR gate signal 233 is active (=1), the TI inputs (FIG. 7A, 7B) of the fifteen flip-flops are selected as the data input. TI inputs come from the outputs of the EXOR gates 222, 223 and 224. Parallel data inputs D0-D15 (FIGS. 7, 9) shown as 201 are EXORed with the outputs of the flip-flops in previous stages. D0 is EXORed with the output of the multiplexor 227 which is effectively the output of the EXOR function 205. At each clock, a shift operation also occurs. This way, the data on D0-D15 is compressed on the MFSR to form a signature. Also, D0-D15 may be the outputs of a combinatorial circuit under test. If the signature obtained from the circuit is "different" from the one that was obtained originally on the good circuit (for example, by simulation) with the same patterns, then the circuit under test is defective.

Figures 8, 9:
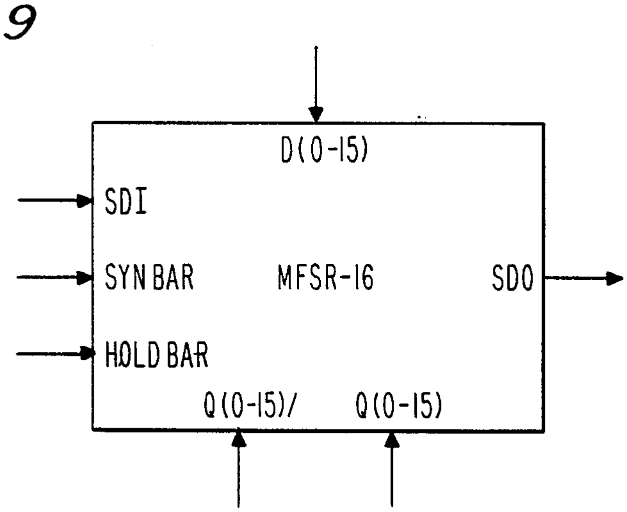
FIG. 8 shows the MFSR function table.
FIG. 9 shows the symbolic representation of the MFSR, multiple function shift register.

All the description of MFSRs given above is summarized in FIG. 8.

Also, a symbol for the 16-bit MFSR is given in FIG. 9, but all maintenance signals are not shown for simplicity.

Figure 10:
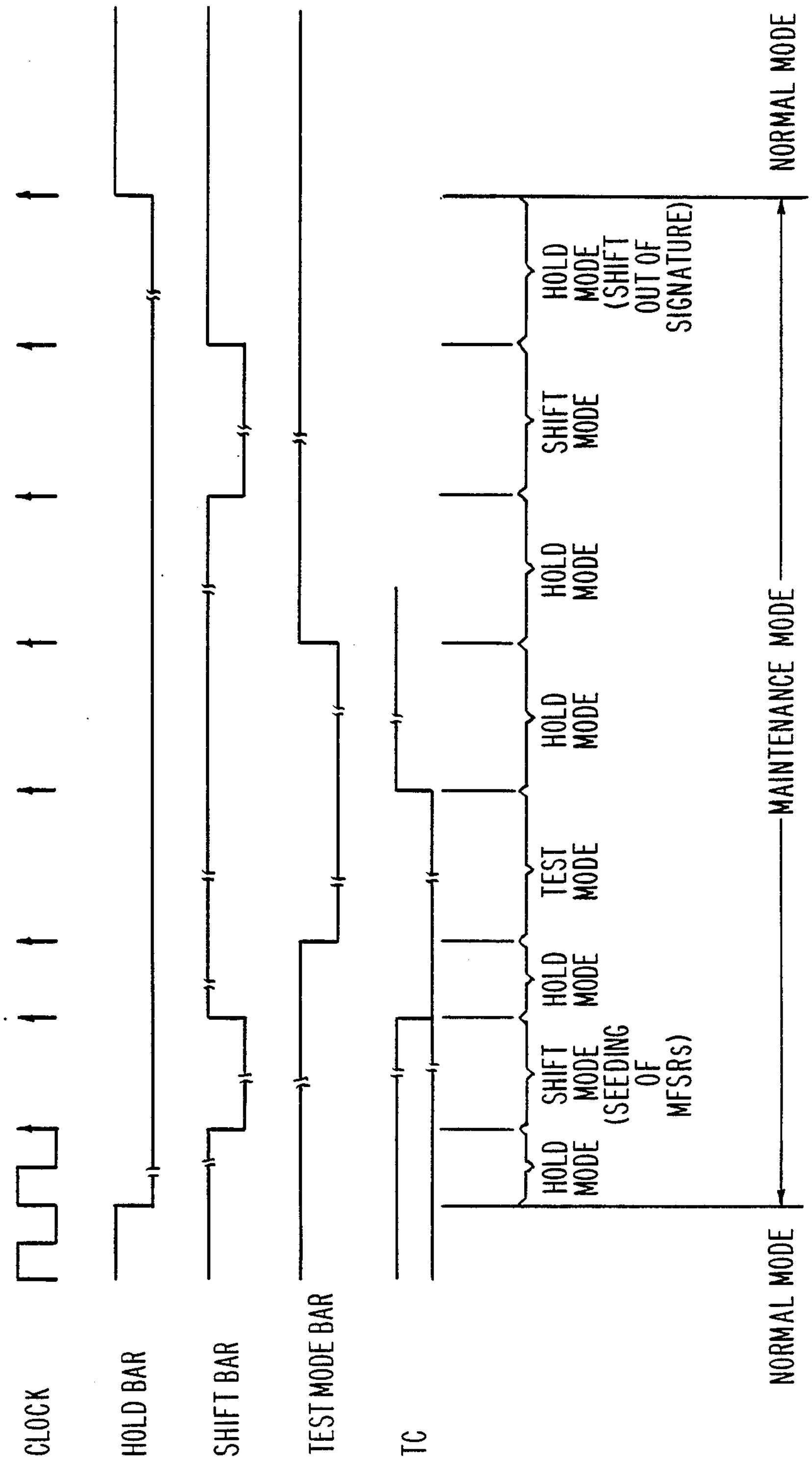
FIG. 10 illustrates the various self test phases.

Referring to FIG. 10, there is seen all the phases of a "self-test" as well as the maintenance control signals (TESTMODE) being asserted or denied.

Also referring back to FIG. 6, an example may be illustrated. With a shift in operation, $MFSR_q$ 107 and $MFSR_p$ 108 should be seeded with non-zero data and configured as random pattern generators to test the CED circuit 110. And also, the error snake MFSRs ($E_s$, FIG. 6) should be configured to collect the singature, being seeded with some data (all-zeros seed possible). Since MFSRs are 16 bits long, they can generate 65,536 minus 1 non-zero patterns. Therefore, the test counter TC in the chip should be seeded with 65,536 minus 1. At each clock, the signature will be collected in the error snake ($E_s$, FIG. 6). Test and signature collection will stop when the test counter asserts the TC 211 signal at 65536−1 clocks later. Then, in the second shift phase, the error snake ($E_s$) is shifted out by the maintenance controller to analyze the signature.

The above illustrates how the "self-test" of the CED circuits is performed with this system.

Figure 11A:
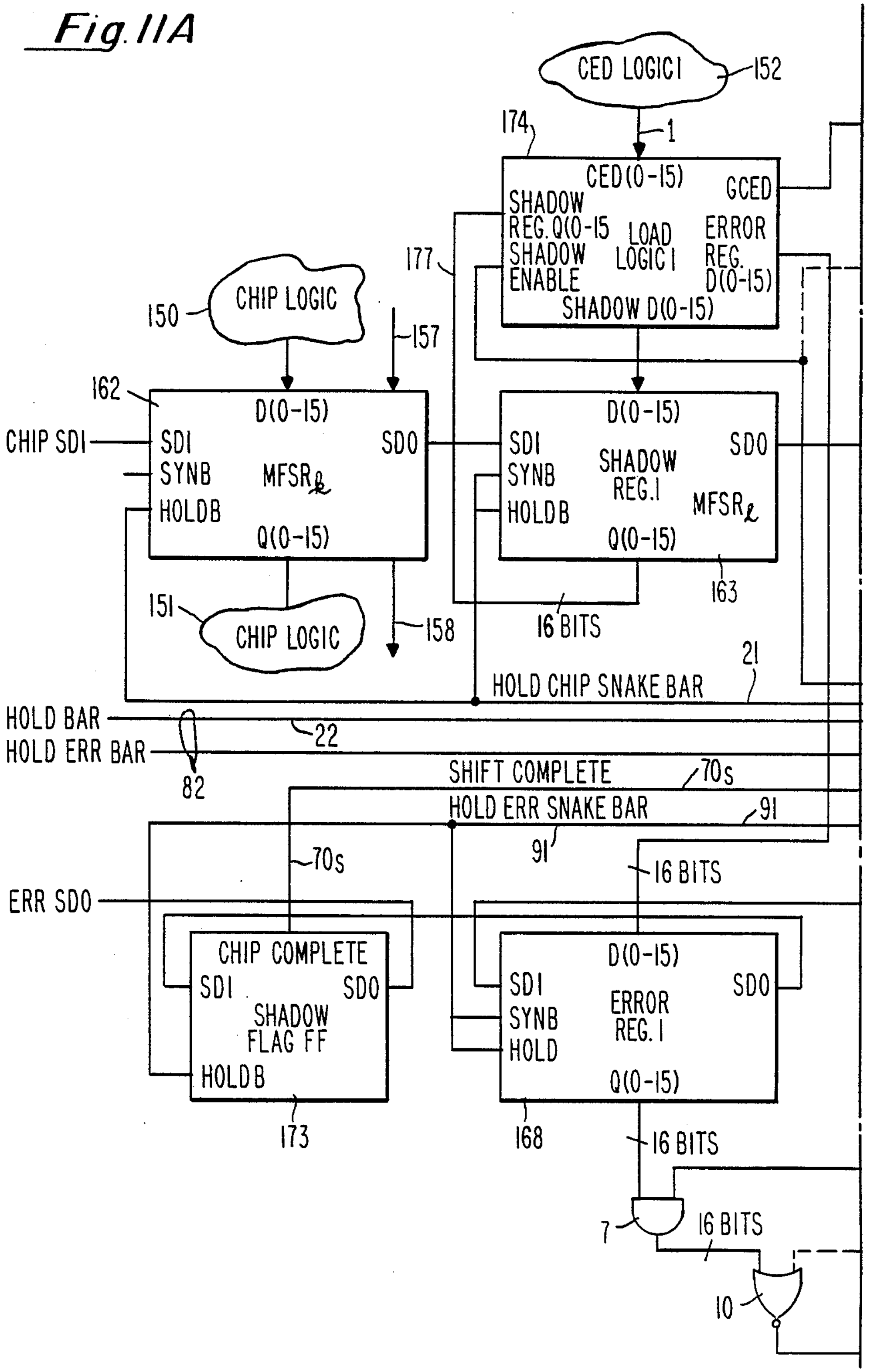
FIGS. 11A, 11B, 11C is a drawing of a high level implementation diagram of the error log system in a chip.

Implementation of the system in a VLSI chip is seen in FIGS. 11A, B, C which shows the chip snake ($C_s$) and the error snake ($E_s$) organization with MFSRs. The shadow register, the error register, mask register, and additional information register, the control and fatal error logic, error load logic, and shadow flag flip-flop are also shown. FIGS. 11A, B, C is analogous to FIG. 1, but provides more detail.

Additionally, to emphasize the expandability of the system, a possible 16-bit expansion is shown by the dotted lines in FIGS. 11A, B, C. The additional blocks are the shadow register, error load logic, error register and the mask register.

In the chip snake ($C_s$), $MFSR_k$ 162 (FIG. 11A) is part of the operational circuit and it represents many MFSRs. Just like $MFSR_k$, $MFSR_x$ 167, FIG. 11C, too represents many MFSRs and it is part of the operational circuit. They perform whatever functions the chip is designed for. They may receive inputs from combinatorial logic, say 150, 154; signals from chip inputs, say 157, FIG. 11A, 159, FIG. 11C. They may generate signals to combinatorial logic circuits, say 151, 155; or the signal they generate, say 158, FIG. 11A, 160 FIG. 11C, may leave the chip on the chip output pins.

$MFSR_l$ 163, FIG. 11A, is the 16-bit MFSR, shadow register ($S_r$) in FIG. 3; and its input comes from the error load logic 1 (174), FIG. 11A, whose inputs are the error signals from the CED circuits shown as 152. The signals shown by line 1 in FIG. 11A are the signals (1) in FIG. 2. If there are more than sixteen CED outputs, expansion is required in the error log system. By dotted lines (in FIGS. 11B and 11C), shown are an expansion shadow register 164 ($MFSR_m$), and an expansion error load logic 175 which captures the error signals from CED logic 153. Each error load logic is equivalent to logic 50 in FIG. 3 and its complete implementation will be discussed hereinafter. Note that the feedback lines 177 (FIG. 11A) and 178 (FIG. 11B) are equivalent to the feedback from the Q output of the flip-flop 2 to the input of the OR gate 3 in FIG. 2. The feedback is for the shadow register to not lose any errors, but to accumulate them. The error load logic 50 sends the error signals to both shadow register 163 and error register 168, FIG. 11A, also generates a GCED signal 31, FIG. 3, for fatal errors. The $GCED_1$ and $GCED_2$ (FIG. 11B) shown by bus 51, (also shown by 31 in FIG. 3), are ORed by gate 176, FIG. 11B. The OR gate 176 is required only if expansion is implemented. The output of OR gate 176 is an input to the control and fatal error logic 165 (FIG. 11B) that generates the signal $60_f$ FATAL-ERR-BAR which is also $60_f$ in FIGS. 3 and 4. The FATAL-ERR-BAR signal $60_f$, FIG. 3, causes the HOLD-CHIP-SNAKE-BAR signal 21 to go active, such that it holds the chip snake ($C_s$). It may also go to the maintenance controller to inform it of the fatal error.

The control and fatal error logic 165, FIG. 11B, contains an MFSR and its details will be subsequently described. Using the HOLD-BAR 22 and HOLD-ERR-BAR 82 (FIG. 3, FIG. 11A) signals from the maintenance controller 100 and the error signal from the OR gate 176, FIG. 11B, and the ERROR-BAR signal 83 from the error snake $MFSR_n$, FIG. 11B, it generates: HOLD-CHIP-SNAKE-BAR 21 for the MFSRs in the chip snake; HOLD-ERR-SNAKE-BAR 91 for the MFSRs in the error snake and the shadow flag flip-flop; CLEAR/LOAD-SHADOW-REG 81, FIG. 11B, for the shadow registers 163 and 164; SHIFT-COMPLETE signal $70_s$ for the shadow flag flip-flop (173, FIG. 11A). These signals have the same reference numbers in FIG. 3.

Also note that all MFSRs are connected to each other to form a "shift path" for the chip snake. The maintenance controller signals SHIFT-BAR and TESTMODE-BAR are connected to all MFSRs in the design (but not shown in FIG. 11A, 11B, 11C). All the maintenance signals are shown in the complete implementation diagrams.

Figures 11, 11A, 11B, 11C:
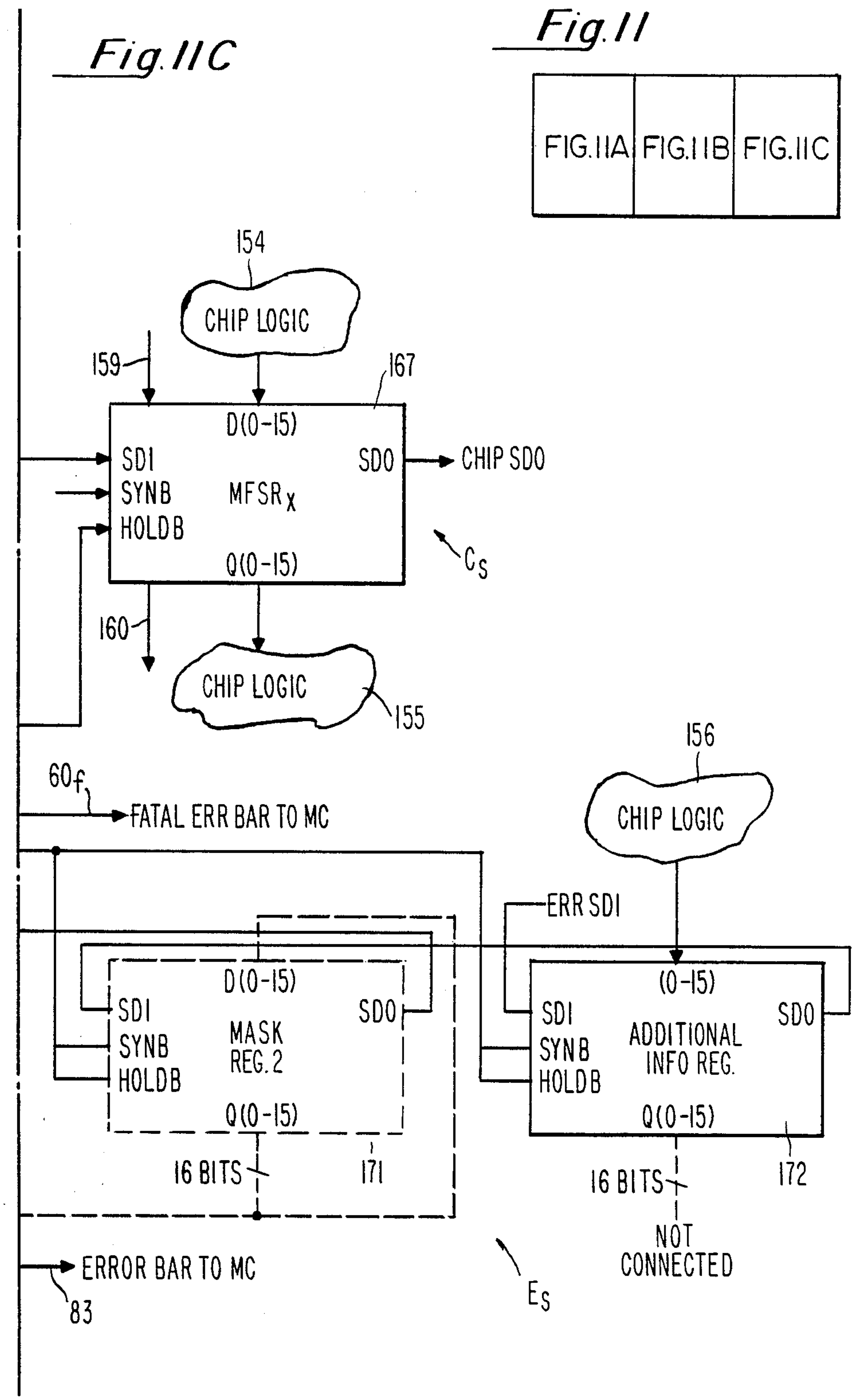
Figure 11B:
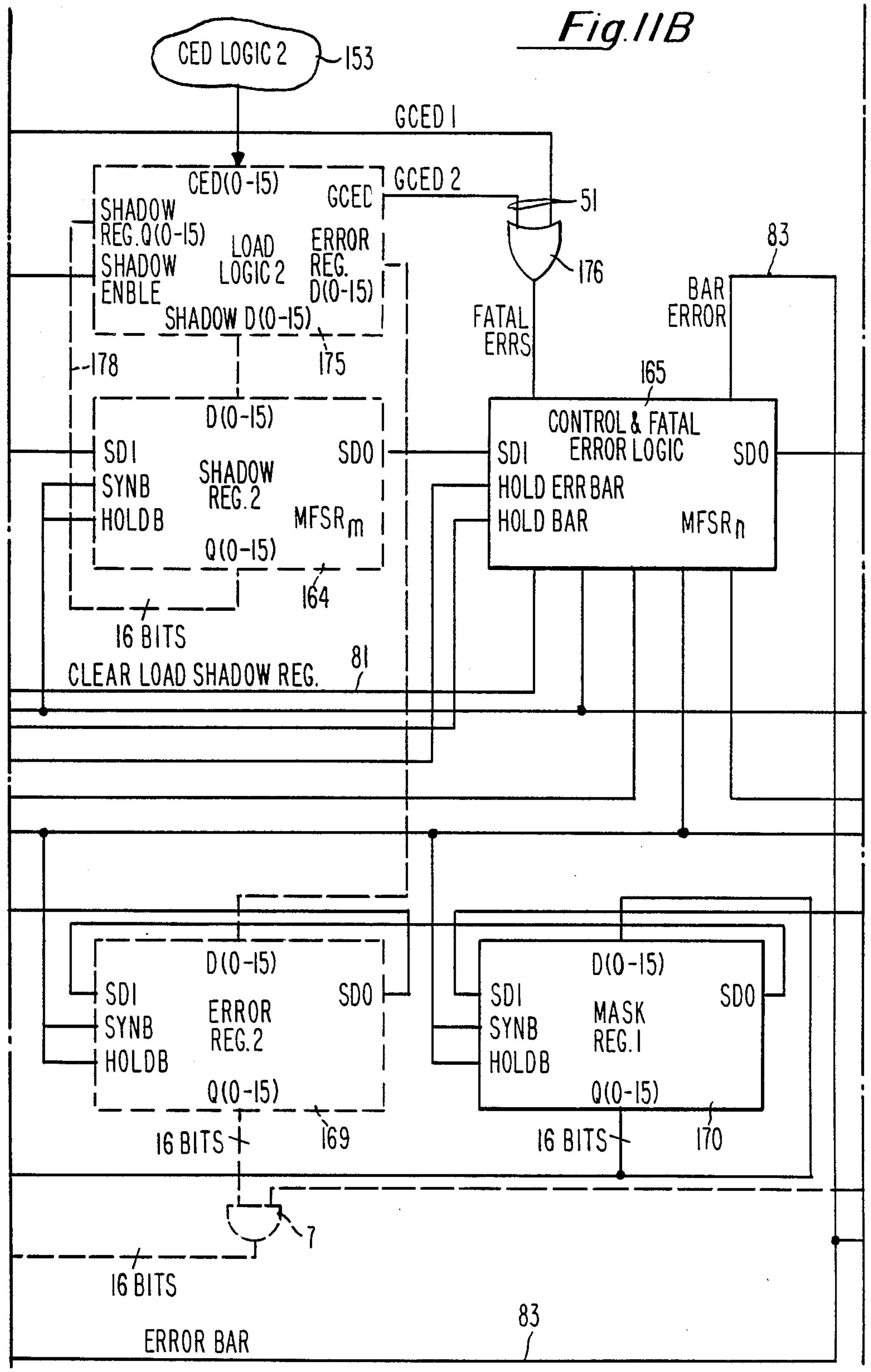

The error snake ($E_s$) in FIG. 11A, 11B, 11C contains: a shadow flag flip-flop 173; the error (first) register 168, which is an MFSR; the error (second) register 169 which is an MFSR; first mask register 170 which is an MFSR; second mask register 171 which is an MFSR; additional information register 172, which may be many MFSRs. The shadow flag flip-flop 173 and MFSRs form a shift path for the error snake.

The error registers 168, 169 (FIGS. 9, 11A, and 11B) are just 16-bit MFSRs. They capture the error signals from the error load logic and causes the ERROR-BAR signal 83, FIG. 11B, to be generated for the unmasked errors. The AND gates 7, FIGS. 11A, 11B, provide the masking function. For each error register and mask register, sixteen such AND gates are required. The gates 7 are analogous to the AND gates 7 and 10 in FIG. 2. The 32-input NOR gate function 10, FIG. 11A generates the ERROR-BAR signal 83 and it is the same NOR gate as 10 in FIG. 2. The ERROR-BAR signal 83 is an input to the control and fatal error logic 165, FIG. 11B. It also connects to the maintenance controller to inform it of error conditions (FIG. 2).

When the maintenance controller 100 receives this signal, it can shift out the error snake and analyze the error register to see which circuit failed. If the shadow flag flip-flop contains a "1", it means the information in the error register was transferred from the shadow register which accumulated the errors that occurred when the error snake was being shifted because of a previous error.

The mask register 170 (FIG. 11B), 171 (FIG. 11C) provides the 16-bit mask information for the two error registers and it is just an MFSR. Note that these are feedback paths from the Q(0-15) outputs to the D(0-15) inputs of the mask register 170 and 171. The mask register MFSRs shift when the SHIFT-BAR signal is active; and will always hold otherwise. Those feedback lines are for the hold function.

The error register 169 (FIG. 11B) and the mask register 171 (FIG. 11C) have been used here for the expansion example.

The additional information register 172, FIG. 11C, may contain as many MFSRs as required by the specific chip design. Its length entirely depends on which information is to be captured corresponding to the errors in the error register. The information in it is frozen when HOLD-ERR-SNAKE-BAR 91 is activated by the ERROR-BAR signal 83. Its inputs may come from chip logic 156, FIG. 11C.

Figure 12A:
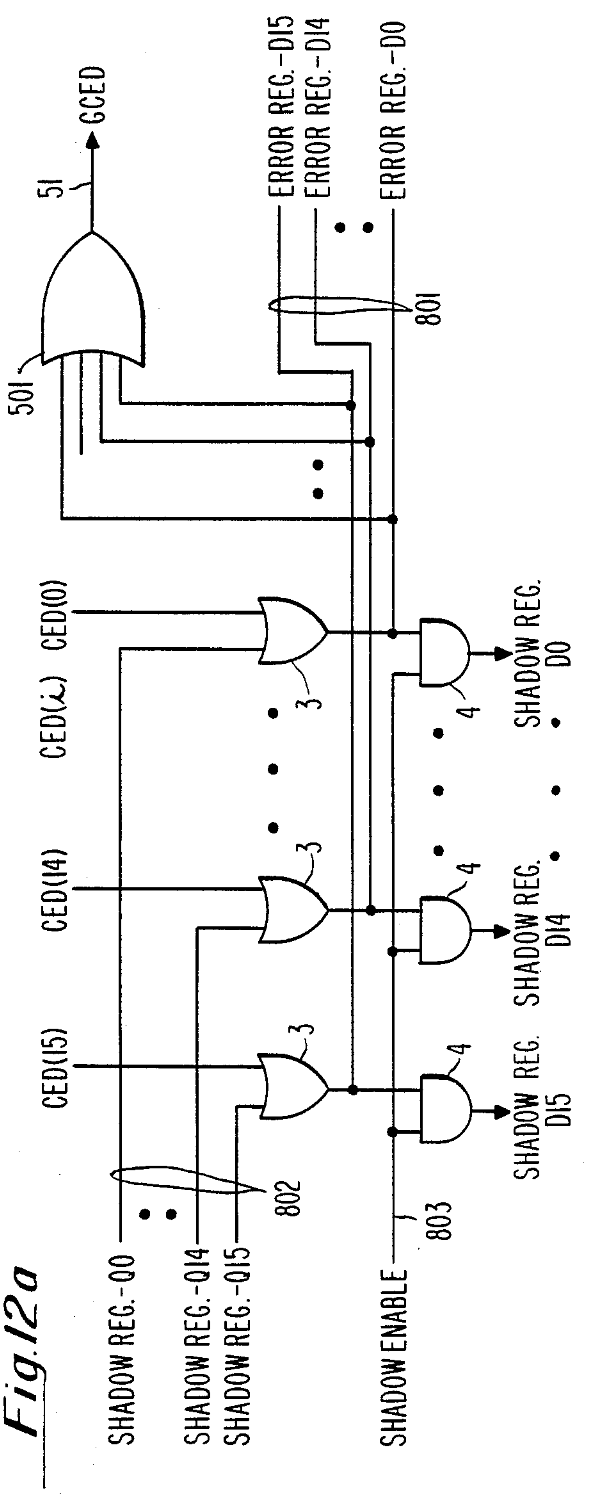
FIG. 12(*a*) shows an error load logic schematic.
Figure 12B:
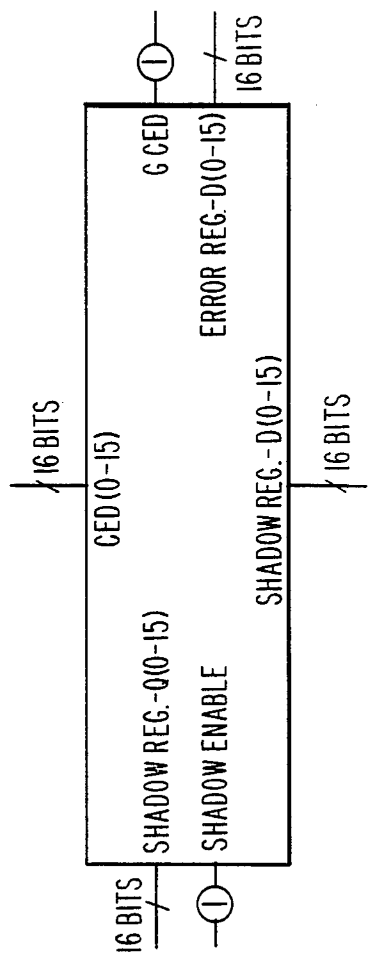

Referring to FIG. 12(*a*), there is seen the details of the error load block, 50 of FIG. 3.

The OR gates shown by 3 and the AND gates shown by 4 are analogous to these in FIG. 2. The GCED signal 51 generated by the OR gate 501 is as shown in FIG. 4 by the same reference numbers. The signals ERROR-REG D0-D15 (801) are the error signals for the error register. The outputs of the AND gates 4, SHADOW-REG D0-D15 are the error signals for the shadow register. The signals SHADOW-REG Q0-Q15, shown by 802, are the feedback lines from the shadow register outputs. The SHADOW-ENABLE signal 803 is connected to the CLEAR/LOAD-SHADOW-REG signal generated by the control 70 and fatal error logic block, 60 of FIG. 3.

FIG. 12(*b*) is a symbolic representation for the load logic used in the system.

Figure 13A:
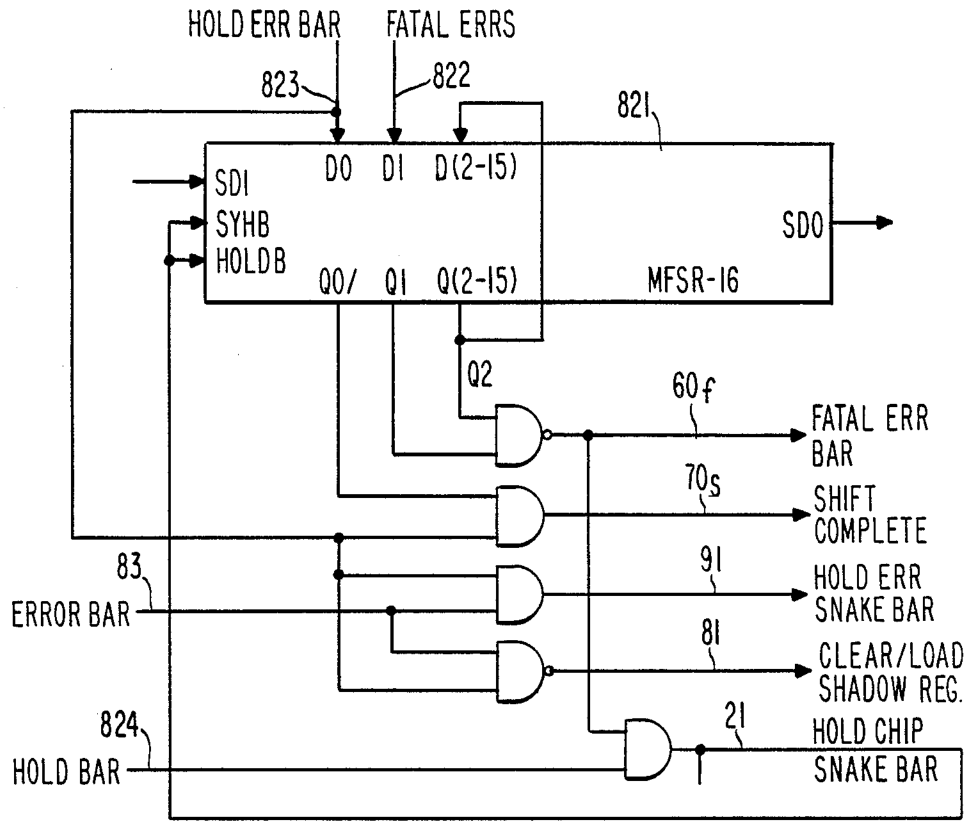
FIG. 13(*a*) shows the control and fatal error logic schematic.
Figure 13B:
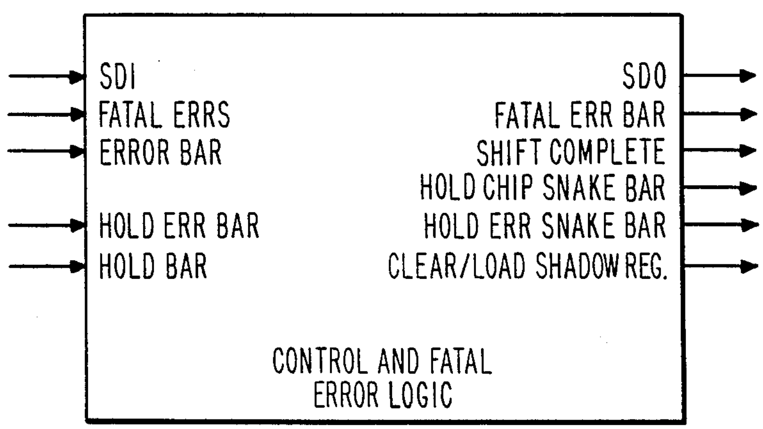

FIG. 13(*a*) is the schematic for the control and fatal error logic 70 and 60 of FIG. 3. It contains a 16-bit MFSR. Only D0, D1 inputs and Q0/, Q1 and Q2 are used. The outputs Q(2-15) are fed back to the inputs D(2-15), so the MFSR could be used as a signature collector for the combinatorial circuits feeding its inputs with signals 822 and 823.

The input 822 comes from the OR gate 176 or the GCED signal 51 if expansion is not implemented. The signals HOLD-BAR 824 and HOLD-ERR-BAR 823 are as shown in FIG. 11A by line 82. The ERROR-BAR signal 83 comes from the NOR gate 10 in FIG. 11A.

The output signals FATAL-ERR-BAR $60_f$, SHIFT-COMPLETE $70_s$, HOLD-ERR-SNAKE-BAR 91, CLEAR/LOAD-SHADOW-REG 81 and HOLD-CHIP-SNAKE-BAR 21 are connected to other blocks in the system as shown in FIGS. 11A, B, C by the same reference numbers.

FIG. 13(*b*) is the symbolic representation for the control and fatal error logic that is used in the system.

Figure 14A:
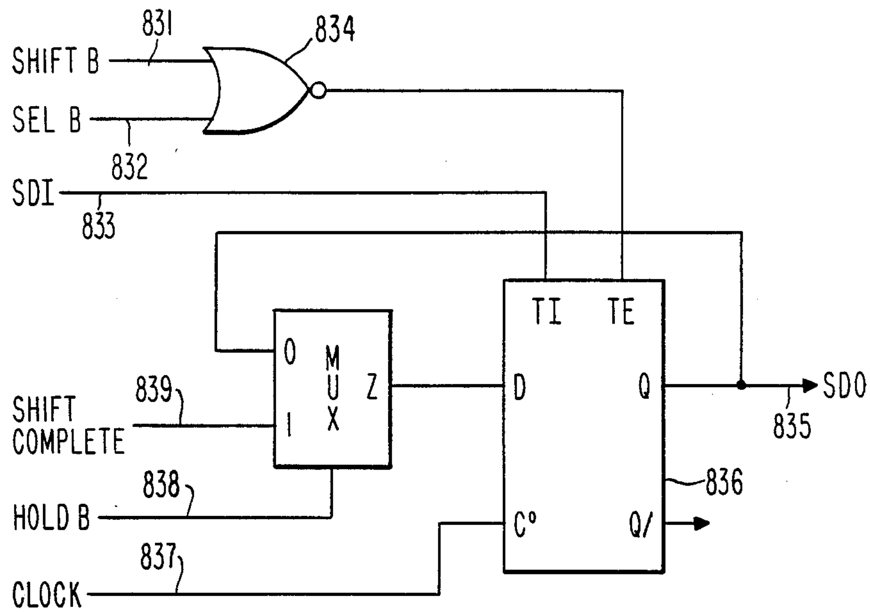
FIG. 14(*a*) shows a shadow flag flip-flop schematic.
Figure 14B:
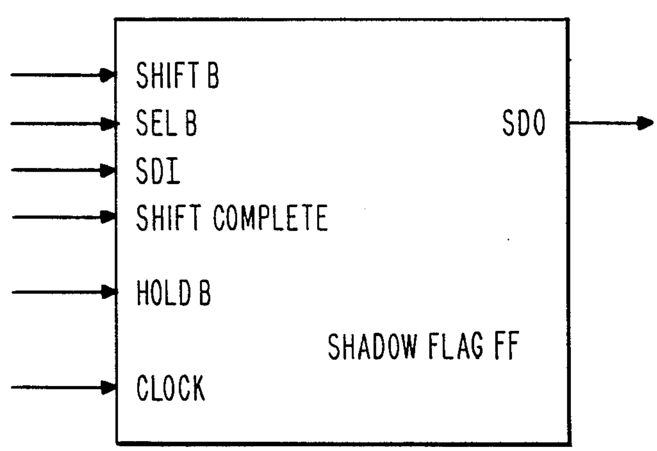

FIG. 14(*a*) is the schematic for the shadow flag flip-flop. A D-type flip-flop is used. The signal SHIFTB 831 is the SHIFT-BAR and the SELB signal 832 is the SEL-BAR from the maintenance controller. The output of the NOR gate 834 selects SDI as the data input on TI. SDI 833 is the serial data input and SDO 835 is the serial data output. The SHIFT-COMPLETE signal 839 comes from the control and fatal error logic block and loads a "1" to the flip-flop 836 when the shift of the error snake is completed. HOLDB 838, when active, holds the flip-flop 836 and is connected to HOLD-ERR-SNAKE-BAR signal 91 from the control and fatal error logic block 165 in FIG. 11B. CLK line 837 (FIG. 14*a*) is the clock input.

FIG. 14(*b*) is the symbol representation for the shadow flag flip-flop that can be used in the system.

Figure 15:
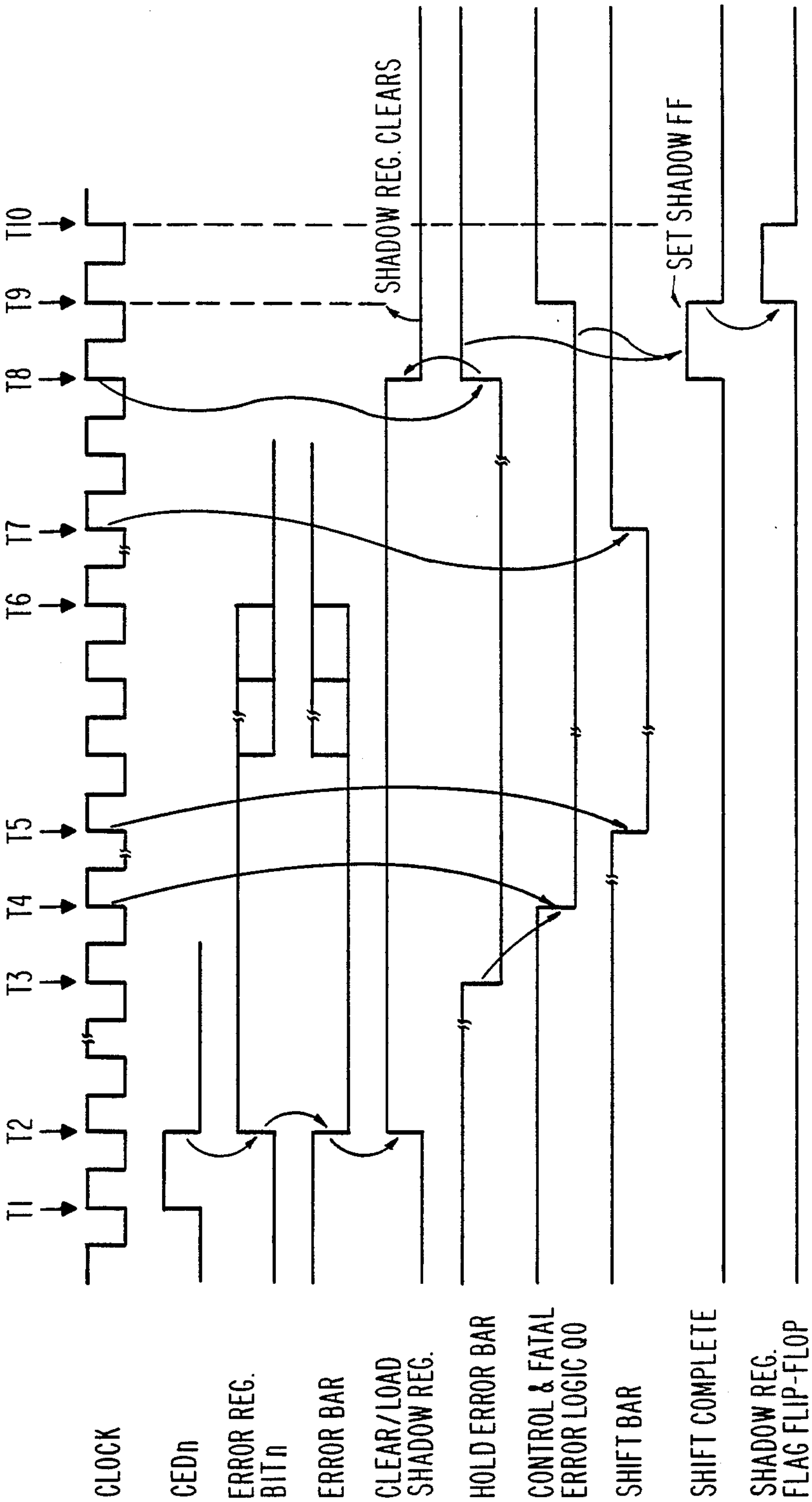
FIG. 15 is a diagram showing timing for the error log system when an error is captured and there are no subsequent errors.

In reference to FIG. 15, it is now assumed that during normal operation of the VLSI circuitry chip, an error occurs and this error is registered in the error register $E_r$ of FIG. 3. Since the snakes are in normal mode, $E_r$ performs a load operation.

The error snake freezes itself and is shifted out by the maintenance controller for error analysis; and it is assumed that no other errors occur during the shift operation. Now it will be seen that the following sequence of activities will occur:

1. For example, one of the concurrent error detector circuits, CEDn, generates an error signal. In FIG. 15 this is shown at the time point T1.

2. In the next clock period, at time T2, the error register bit "n" in the error register is set. If the circuit is not masked, then the ERROR-BAR signal goes "active" which freezes the error snake ($E_s$ in FIG. 3) and then enables the shadow register $S_r$ of FIG. 3. The ERROR-BAR signal 83 of FIG. 2 and signal line 83 of FIG. 11 goes off the chip and alerts the maintenance controller 100 for error analysis. If the error is fatal, the chip snake ($C_s$ of FIG. 11) is also held frozen, (hold function).

3. When the maintenance controller 100 operates to select and make a shift operation to analyze the error, it asserts the HOLD-ERROR-BAR signal 82 of FIG. 3; (and 82 of FIG. 2) which also freezes the error snake ($E_s$ of FIG. 3), performing a hold function on the MFSRs.

4. In the next following clock time, at time T4, the control and fatal control logic QO output will go to "0" (in FIG. 13).

5. Then some clocks later, - for example, at time T5, the maintenance controller 100 selects the error snake and asserts the SHIFT-BAR at time T5 as shown in FIG. 15. In the next clock, the shift operation then starts. The SHIFT-BAR signal remains active until after all of the bits in the error snake are shifted out to the maintenance controller 100.

6. The maintenance controller 100 will shift all zeroes into the error register ($E_r$) and also restore the mask register ($M_r$ of FIG. 3) information as it shifts out. As soon as the error data is shifted out, - as, for example, at time T6, the ERROR-BAR signal goes inactive.

7. The maintenance controller 100 then denies the SHIFT-BAR at time, - for example, T7, as soon as the shift is complete.

8. Then, some clocks later, as, - for example, at time T8, the maintenance controller 100 releases the HOLD-ERROR-BAR signal which causes the SHIFT-COMPLETE signal to be asserted for one clock, at time T8.

9. Now, since the SHIFT-COMPLETE signal has been high in the previous clock from T8 to T9, then the shadow flag flip-flop output goes high, as seen in FIG. 15.

Since it has been assumed here that no errors have occurred during the error register shift operation, the shadow register will be cleared at time T9 or the end of clock T8 which, in turn, will clear the shadow flag flip-flop in the next clock at time T10.

Now the error snake ($E_s$ of FIG. 3) is ready to receive further error signals.

Figure 16:
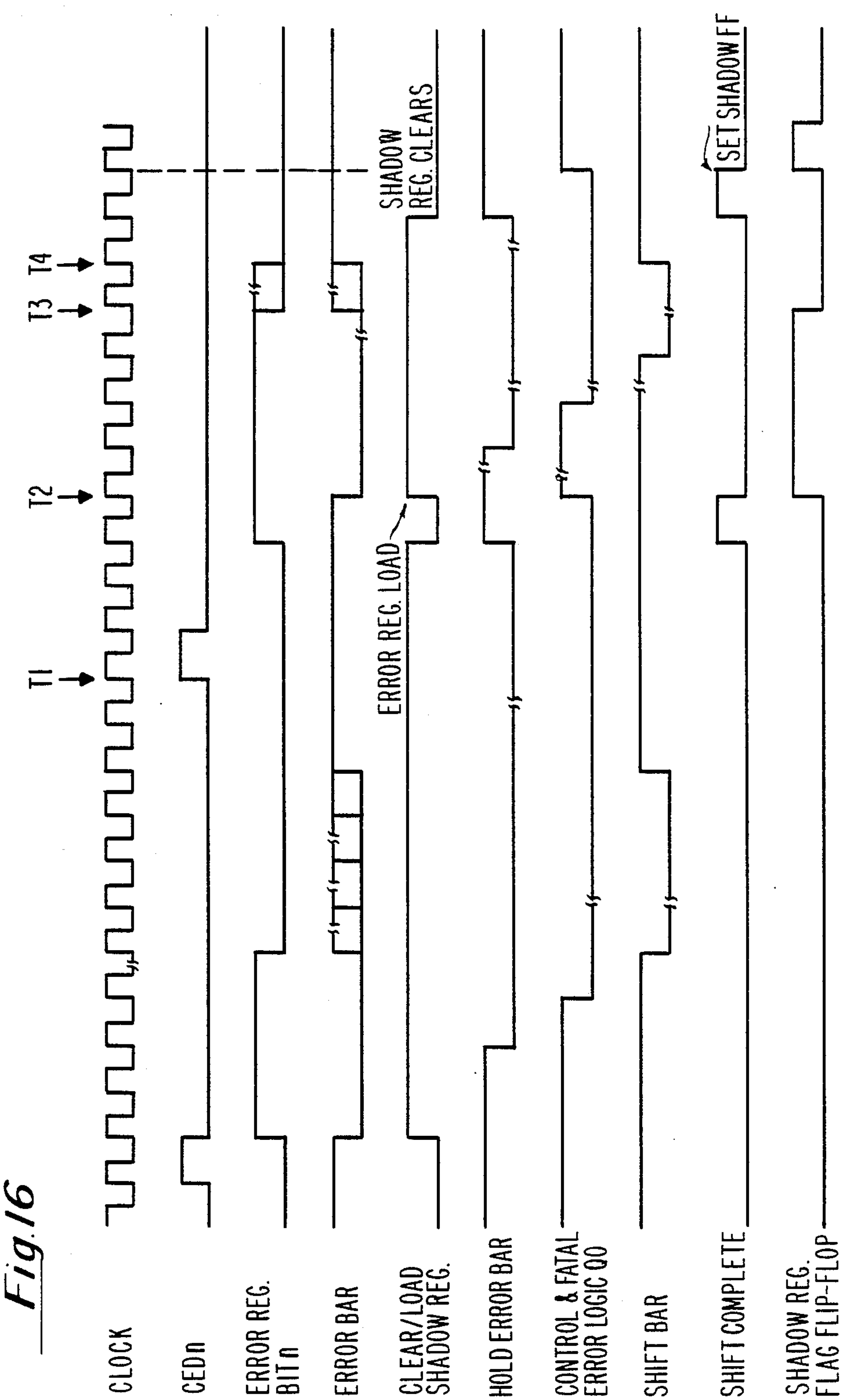
FIG. 16 is a diagram showing timing for the error log system when an error is captured and when subsequent errors occur.

With reference to FIG. 16, the assumption is made that an error occurs and the error signal is stored in the shadow register $S_r$ of FIG. 3 when the error snake $E_r$ is being shifted out because of a previous error. The shadow register $S_r$ is shown in FIG. 2, FIG. 3 and FIG. 11.

The sequence of events which transpire are shown in FIG. 16 with certain time points designated as T1 through T4 as discussed hereinbelow.

1. At time T1, the CEDn signal indicates that an error has occurred, which is then registered in the shadow registers $S_r$ because the CLEAR/LOAD-SHADOW-REG signal is active (that is, in the "high" position). At time T2 in FIG. 16 the shift is completed but the HOLD-ERROR-BAR is still active due to the previous error signal. Therefore, the shift process is still active.

2. Up until this point of clock time T2, the signal activities will be seen to be the same as that shown in FIG. 15 previously. However, after the clock time of T2, since the HOLD-ERROR-BAR is inactive, the contents of the shadow register $S_r$ will be transferred to the error register $E_r$ causing the ERROR-BAR signal to go active at time T3. This will, in turn, cause a shift operation (assertion of SHIFT-BAR signal) to be initiated from the maintenance controller 100.

3. Since there is an error signal in the shadow register $S_r$, the shadow flag flip-flop 173 of FIG. 11 will hold a "high" level at least until the shift operation has started and thence it will go high and low depending on where the error bits are in the error register $E_r$. The shadow flag flip-flop 173 of FIG. 1 is the first bit that is shifted out.

4. After the shifting operation has been completed, the circuit will behave in the same fashion as was described in connection with FIG. 15.

There has been described herein a specialized VLSI chip which includes means for detecting and logging errors which can be reported to an associated maintenance controller. Both intermittent and permanent errors are reported. Non-fatal errors do not stop the normal operation of the chip but detection of a fatal error (which ruins the chip integrity) will cause the chip to be frozen into a hold mode to prevent any further propagation of errors.

The versatility provided allows each error bit to be masked in order to facilitate debugging and isolation of the problem area. Additional information, such as the address of the problem area of a specific error, may be obtained in an additional register of the error log circuitry without disturbing the normal operation of the chip.

Errors are detected by concurrent error detection circuitry (CED) and the built-in self-testing circuitry (BIST) tests the CED circuitry itself and also the transmission of data to/from the associated maintenance controller.

The chip is tested when the maintenance controller initializes the chip causing a first set of multi-function shift registers to generate test patterns, and a second set of multi-function shift registers to collect signatures which can then be analyzed by the maintenance controller to determine the correct operation of the chip.

While other implementations of the above functions may be designed, it is to be understood that the invention is defined by the following claims.

What is claimed is:

1. A VLSI chip architecture having built-in self-test circuitry and concurrent error detection circuitry cooperating with error logging circuitry for reporting to a maintenance controller, comprising, in combination:
   - (a) functional logic circuitry connected as part of a shift chain of multifunction shift registers composed of flip-flop units;
   - (b) concurrent error detection circuitry (CED) connected to sense errors in said functional logic circuitry during normal chip operations;
   - (c) means, using said maintenance controller, to initialize said functional logic circuitry for normal chip operation; and including:
     - (c1) means to access said functional logic circuitry as a shift chain and to perform a shift operation for setting up an initial machine state in each said flip-flop unit;
   - (d) means, connected to said functional logic circuitry and to said concurrent error detection circuitry, to log and accumulate error-related information after initialization of normal chip operation.

2. The combination of claim 1 wherein said means to log and accumulate error-related information includes:
   - (a) load logic means to convey error-related information from said concurrent error detector to an error snake means;
   - (b) said error snake means for holding said error-related information such as invalid addresses, incorrect data bits, failed control signals, and wrong state machine sequence transitions, involved in data transfers and including:
     - (b1) an error register means ($E_r$) of n bits to hold said error-related information in a group of bits.

3. The combination of claim 2 wherein said error snake means further includes:
   - (a) a mask register means of n bits for preventing selected error-related information from generating an interrupt signal to said maintenance controller;
   - (b) a plurality of concatenated multiple function shift registers to capture additional error-related information received from said functional logic circuitry and from other parts of the VLSI chip, said multiple function shift registers connected to include:
     - (b1) an additional information register ($A^r$) means to indicate the source location of said error-related information, said information register means expandable by m bits where m is an integer;

(b2) a shadow register ($S_r$) means to receive information on errors detected by said CED circuitry inside the said VLSI chip, and to transmit said information to said error snake means, after transfer of said error-related information from said error register means to said maintenance controller.

4. The combination of claim 2 which includes:

(a) a shadow register means to store error information on errors inside the said chip during time periods of transfer of data from said error register to said maintenance controller; and to transmit said error information to said error snake means.

5. The combination of claim 2 wherein said error snake means includes:

(a) means to communicate its error information to said maintenance controller.

6. The combination of claim 2 which includes control logic means, to halt operation of said VLSI chip upon detection of a fatal error, including:

(a) means to detect a fatal error;

(b) means to stop further operation of said VLSI chip upon detection of said fatal error.

7. The combination of claim 2 wherein said error snake means maintains a sequence of "0's" when no errors are sensed.

8. The combination of claim 2 which includes:

(a) means for stopping and freezing said error snake means in order to transmit said error-related information to said maintenance controller.

9. The combination of claim 1 wherein said concurrent error detection (CED) circuitry includes:

(a) parity checking means;

(b) means for checking proper sequencing of state machine transitions;

(c) means to check for proper combinations of control signals;

(d) means to check for valid addresses;

(e) means to check for data words with incorrect bits.

10. A VLSI chip architecture having built-in self-test circuitry and concurrent error detection circuitry (CED) cooperating with error logic circuitry which reports information to a maintenance controller, comprising, in combination:

(a) means to log errors during normal operation of said chip said means including:

(a1) a first set of flip-flop register means for storing information on errors which have occurred during normal chip operations, and, (a2) a second set of flip-flop register means for storing information on errors having occurred during times of transfer of information from said first register means to said maintenance controller;

(a3) wherein said first set of flip-flop register means forms an error snake of multiple function shift registers and includes means to generate an interrupt signal to said maintenance controller;

(b) means to transmit data of said information on errors to a maintenance controller without disrupting normal chip operations, said means including:

(b1) shift control signal means generated by said maintenance controller for initializing, shifting and clearing information in said multiple function shift registers;

(c) said maintenance controller for providing a data readout to a computer screen to alert a human operator of the errors accumulated and their source location.

11. The combination of claim 10 which includes:

(a) means for executing self testing of said concurrent error detection circuitry (CED).

12. The combination of claim 11 wherein said means for executing self testing of said CED circuits constitutes a chip snake means which includes:

(a) a shadow register to receive and accumulate error information from said CED circuitry; and (b) a plurality of said multiple function shift registers which include:

(b1) means to generate test patterns for said CED circuitry;

(b2) means to collect signature data for each test pattern;

(b3) means to transmit said signature data to said maintenance controller which conveys said signature data to an external computer means;

(c) external computer means for comparing said signature data with predetermined signatures to determine integrity of said CED circuitry.

13. The combination of claim 11 wherein said means for executing self testing of said CED circuitry includes:

(a) means to generate test patterns for said CED circuitry;

(b) means to collect signature data from said test patterns;

(c) means to transmit said signature data to said maintenance controller;

(d) means, in said maintenance controller, to transmit said signature data to an external computer for signature verification.

14. The combination of claim 10 which includes:

(a) means to freeze (immobilize) operation of said VLSI chip upon detection of a fatal error;

(b) means for detecting said fatal error as one which is not correctable and would vitiate integrity of data transmitted from said VLSI chip.

15. The combination of claim 10 wherein said means to log errors includes:

(a) a first register means for storing information on errors sensed by said CED circuitry; and (b) a second register means for storing information on errors sensed and occurring during transfer of data from said first register means to said maintenance controller.

16. The combination of claim 10 which includes:

(a) mask register means, accessed by said maintenance controller, to inhibit or enable the capability of said error snake means to generate an interrupt signal to said maintenance controller on selected error information in said error snake.

17. The combination of claim 10 wherein said first set of flip-flop register means includes:

(a) an error register means to log errors occurring in said functional logic circuitry and from said concurrent error detection (CED) circuitry.

(b) a mask register, accessed by said maintenance controller, for inhibiting or enabling the reporting of selected error information to said maintenance controller.

(c) an additional information register for reading out specific error-related information regarding the address of the location having a fault in said chip logic, said additional information register being expandable in size.

(d) a shadow flip-flop flag to inform the maintenance controller whether error information has been transmitted to said maintenance controller from a shadow register means or from said functional logic circuitry;

and wherein said second set of flip-flop register means includes said shadow register means for logging errors detected by said CED circuitry.

18. The combination of claim 10 wherein said means to log errors and said means to transmit data to said maintenance controller constitutes said error snake means which further includes:

(a) serial data input means from said maintenance controller;

(b) serial data output means to said maintenance controller;

(c) said plurality of multiple function shift registers functioning to receive and store error information for subsequent transmittal to said maintenance controller.

19. In a network where a VLSI chip having functional logic circuitry and concurrent error detection (CED) circuitry is serviced by a maintenance controller connected to an external computer system, the combination comprising:

(a) concurrent error detection (CED) circuitry means within said chip for detecting errors in operation of said functional circuitry;

(b) error snake means within said chip for receiving and storing error-related information from said CED circuitry, and including:

(b1) means to transmit an interrupt signal to said maintenance controller;

(b2) means to transmit said error-related information to said maintenance controller;

(c) accumulator means within said chip to store and hold error-related information from said CED circuitry during time periods that said error snake means is transmitting error-related information to said maintenance controller, and including:

(c1) means to transfer said stored error-related information to said error snake means immediately after said error information is transferred by said error snake to said maintenance controller.

(d) a maintenance controller for receiving error-related information from said error snake means and including (d1) means for controlling said error snake means in its function of collecting and transmitting said error-related information.

20. The combination of claim 19 which includes:

(a) self testing means within said chip for checking operation of said CED circuitry and said functional circuitry.

21. The combination of claim 19 wherein said self testing means includes:

(a) pattern generation means for transmission to said CED circuitry and said functional circuitry;

(b) signature collection means useful for verification against predetermined signatures.

22. A VLSI chip which provides internal error logging and self testing functions comprising:

(a) first register stage flip-flop means for receiving and storing error-related information from internally situated concurrent error detection circuitry (CED);

(b) functional logic circuitry having external inputs and outputs for handling data flow;

(c) concurrent error detection (CED) circuitry for monitoring said functional logic circuitry and sensing the occurrence of errors in said functional logic circuitry;

(d) means for interrupting an external maintenance controller and for transmitting said error-related information to said maintenace controller;

(e) said maintenance controller functioning to:

(e1) enable said first register stage flip-flop means to receive error-related information;

(e2) freeze said received error information in said first register stage flip-flop means in order to enable transmission of said error-related information to said maintenance controller.

23. The VLSI chip of claim 22 wherein said first register stage flip-flop means includes:

(a) masking means, controlled by said maintenance controller, for inhibiting or enabling selected portions of said error-related information for transmission to said maintenance controller.

24. The VLSI chip of claim 23 which further includes:

(a) a second stage register flip-flop means for accumulating said error-related information during periods when said first stage register flip-flop means is frozen or is transmitting said information to said maintenance controller.

25. The VLSI chip of claim 24 which includes:

(a) built-in test generation means for input to said CED circuitry and said functional circuitry;

(b) built-in signature collection means to collect the output of said CED circuitry;

(c) means to transmit said collected signature to external means for sensing faulty operation of said CED circuitry and said functional circuitry.

26. A VLSI chip, having internal functional logic circuitry and concurrent error detection circuitry (CED), which provides error logging and built-in self-test operations, said chip comprising:

(a) means to log error information immediately as it occurs;

(b) means to transmit said error information to external analysis means;

(c) internal self-test means to generate patterns and to collect signatures for transmission to said external analysis means.

* * * * *